United States Patent
Hayashi et al.

(10) Patent No.: US 12,448,555 B2
(45) Date of Patent: Oct. 21, 2025

(54) COMPOSITION FOR FORMING THERMALLY CONDUCTIVE MATERIAL, THERMALLY CONDUCTIVE MATERIAL, AND SURFACE-MODIFIED INORGANIC SUBSTANCE

(71) Applicant: FUJIFILM Corporation, Tokyo (JP)

(72) Inventors: Daisuke Hayashi, Ashigarakami-gun (JP); Seiichi Hitomi, Ashigarakami-gun (JP); Teruki Niori, Ashigarakami-gun (JP); Keita Takahashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 873 days.

(21) Appl. No.: 17/574,693

(22) Filed: Jan. 13, 2022

(65) Prior Publication Data

US 2022/0135861 A1    May 5, 2022

Related U.S. Application Data

(63) Continuation of application No. PCT/JP2020/026905, filed on Jul. 9, 2020.

(30) Foreign Application Priority Data

Jul. 17, 2019  (JP) ................. 2019-131897
Apr. 3, 2020   (JP) ................. 2020-067311

(51) Int. Cl.
| | |
|---|---|
| C09K 5/14 | (2006.01) |
| C08G 59/24 | (2006.01) |
| C08G 59/62 | (2006.01) |
| C08G 59/68 | (2006.01) |
| C08K 9/04 | (2006.01) |
| C09C 1/00 | (2006.01) |
| C09C 3/08 | (2006.01) |

(52) U.S. Cl.
CPC .............. *C09K 5/14* (2013.01); *C08G 59/245* (2013.01); *C08G 59/623* (2013.01); *C08G 59/686* (2013.01); *C08G 59/688* (2013.01); *C08K 9/04* (2013.01); *C09C 1/00* (2013.01); *C09C 3/08* (2013.01); *C01P 2006/32* (2013.01); *C08K 2201/001* (2013.01)

(58) Field of Classification Search
CPC ...... C09K 5/14; C08G 59/245; C08G 59/623; C08G 59/686; C08G 59/688; C08G 59/40; C08K 9/04; C08K 2201/001; C08K 2003/2227; C08K 2003/385; C08K 9/06; C08K 3/22; C08K 3/38; C09C 1/00; C09C 3/08; C09C 3/10; C09C 3/12; C01P 2006/32; C08L 63/00
See application file for complete search history.

(56) References Cited

U.S. PATENT DOCUMENTS

| | | |
|---|---|---|
| 2010/0288968 A1 | 11/2010 | Lin et al. |
| 2017/0247546 A1 | 8/2017 | Takahashi |
| 2018/0327265 A1 | 11/2018 | Hitomi et al. |
| 2018/0327602 A1 | 11/2018 | Takahashi |
| 2020/0140275 A1 | 5/2020 | Hitomi et al. |
| 2020/0148538 A1 | 5/2020 | Hitomi et al. |
| 2020/0180957 A1 | 6/2020 | Hitomi et al. |

FOREIGN PATENT DOCUMENTS

| | | |
|---|---|---|
| JP | 2001-192500 A | 7/2001 |
| JP | 2012-526906 A | 11/2012 |
| JP | 2014-156545 A | 8/2014 |
| JP | 2015-920 A | 1/2015 |
| WO | 2016/084873 A1 | 6/2016 |
| WO | 2017/117238 A2 | 7/2017 |
| WO | 2017/131005 A1 | 8/2017 |
| WO | 2019/013261 A1 | 1/2019 |

(Continued)

OTHER PUBLICATIONS

International Search Report issued Sep. 24, 2020 in International Application No. PCT/JP2020/026905.
Written Opinion of the International Searching Authority issued Sep. 24, 2020 in International Application No. PCT/JP2020/026905.
International Preliminary Report on Patentability issued Jan. 18, 2022 in International Application No. PCT/JP2020/026905.

(Continued)

*Primary Examiner* — Andrew J. Oyer
(74) *Attorney, Agent, or Firm* — Sughrue Mion, PLLC

(57) ABSTRACT

The present invention provides a composition for forming a thermally conductive material, from which a thermally conductive material having excellent adhesiveness can be obtained. In addition, the present invention provides a thermally conductive material and a surface-modified inorganic substance. The composition for forming a thermally conductive material of the present invention is a composition for forming a thermally conductive material containing a surface-modified inorganic substance and a thermosetting compound, the surface-modified inorganic substance satisfying at least one of Requirement 1 or Requirement 2. Requirement 1: The surface-modified inorganic substance includes a surface-modified inorganic substance X containing the inorganic substance, and a surface modifier A and a surface modifier B adsorbed on a surface of the inorganic substance. Requirement 2: The surface-modified inorganic substance includes a surface-modified inorganic substance A containing the inorganic substance and the surface modifier A adsorbed on the surface of the inorganic substance, and a surface-modified inorganic substance B containing the inorganic substance and the surface modifier B adsorbed on the surface of the inorganic substance.

19 Claims, No Drawings

(56) References Cited

FOREIGN PATENT DOCUMENTS

WO   2019/013325 A1   1/2019
WO   2019/013343 A1   1/2019

OTHER PUBLICATIONS

Office Action dated Sep. 13, 2022 from the Japanese Patent Office in JP Application No. 2021-533022.
Extended European Search Report dated Jul. 26, 2022 in European Application No. 20840734.6.

COMPOSITION FOR FORMING THERMALLY CONDUCTIVE MATERIAL, THERMALLY CONDUCTIVE MATERIAL, AND SURFACE-MODIFIED INORGANIC SUBSTANCE

CROSS-REFERENCE TO RELATED APPLICATIONS

This application is a Continuation of PCT International Application No. PCT/JP2020/026905 filed on Jul. 9, 2020, which claims priority under 35 U.S.C. § 119(a) to Japanese Patent Application No. 2019-131897 filed on Jul. 17, 2019 and Japanese Patent Application No. 2020-067311 filed on Apr. 3, 2020. Each of the above applications is hereby expressly incorporated by reference, in its entirety, into the present application.

BACKGROUND OF THE INVENTION

1. Field of the Invention

The present invention relates to a composition for forming a thermally conductive material, a thermally conductive material, and a surface-modified inorganic substance.

2. Description of the Related Art

In recent years, a power semiconductor device used in various electrical machines such as a personal computer, a general household electric appliance, and an automobile has been rapidly miniaturized. With the miniaturization, it is difficult to control heat generated from the power semiconductor device having a high density.

In order to deal with such a problem, a thermally conductive material, which promotes heat dissipation from the power semiconductor device, is used.

For example, JP2014-156545A discloses an insulating thermally conductive filler dispersion composition containing "boron nitride surface-treated with an organosilicon-based coupling agent or an organophosphorus-based coupling agent" (claim 2).

SUMMARY OF THE INVENTION

The present inventors have studied a thermally conductive material composed of the insulating thermally conductive filler dispersion composition described in Patent Document 1, and have found that there is room for improvement in the adhesiveness (adhesive strength) with an object (adhesive body) to which the heat conductive material should be applied to promote heat dissipation.

Therefore, an object of the present invention is to provide a composition for forming a thermally conductive material, from which a thermally conductive material having excellent adhesiveness can be obtained.

Moreover, another object of the present invention is to provide a thermally conductive material and a surface-modified inorganic substance.

As a result of a thorough examination conducted to achieve the objects, the present inventors have found that the objects can be achieved by the following configuration.

[1] A composition for forming a thermally conductive material, comprising:
a surface-modified inorganic substance; and
a thermosetting compound,
in which the surface-modified inorganic substance satisfies at least one of the following Requirement 1 or Requirement 2.
Requirement 1: The surface-modified inorganic substance includes a surface-modified inorganic substance X containing an inorganic substance, and a surface modifier A and a surface modifier B adsorbed on a surface of the inorganic substance, the surface modifier A and the surface modifier B each independently have one or more adsorbent groups selected from the group consisting of an alkoxysilyl group, an aldehyde group, and a boronic acid group, and one or more aromatic rings, the total number of monocyclic aromatic ring structures in the one or more aromatic rings is 2 or greater, the surface modifier A further has one or more functional groups A selected from the group consisting of an epoxy group, an oxetanyl group, and an isocyanate group, and the surface modifier B further has one or more functional groups B selected from the group consisting of a hydroxyl group, $-NHR^T$, a carboxyl group, a thiol group, and a phosphoric acid group. $R^T$ represents a hydrogen atom or an alkyl group.
Requirement 2: The surface-modified inorganic substance includes a surface-modified inorganic substance A containing the inorganic substance and the surface modifier A adsorbed on the surface of the inorganic substance, and not containing the surface modifier B, and a surface-modified inorganic substance B containing the inorganic substance and the surface modifier B adsorbed on the surface of the inorganic substance, and not containing the surface modifier A.

[2] The composition for forming a thermally conductive material as described in [1], in which the total number in the surface modifier A and the surface modifier B is each independently 3 or greater.

[3] The composition for forming a thermally conductive material as described in [1] or [2], in which the total number of the surface modifier A and the surface modifier B is each independently 4 or greater.

[4] The composition for forming a thermally conductive material as described in any one of [1] to [3], in which the inorganic substance includes an inorganic nitride.

[5] The composition for forming a thermally conductive material as described in any one of [1] to [4], in which the thermosetting compound includes an epoxy compound.

[6] The composition for forming a thermally conductive material as described in [5], in which the thermosetting compound further includes a phenolic compound.

[7] The composition for forming a thermally conductive material as described in any one of [1] to [6], further including a curing accelerator.

[8] A thermally conductive material which is obtained by curing the composition for forming a thermally conductive material as described in any one of [1] to [7].

[9] A surface-modified inorganic substance, in which the surface-modified inorganic substance satisfies at least one of the following Requirement 1 or Requirement 2.
Requirement 1: The surface-modified inorganic substance includes a surface-modified inorganic substance X containing an inorganic substance, and a surface modifier A and a surface modifier B adsorbed on a surface of the inorganic substance, the surface modifier A and the surface modifier B each independently have one or more adsorbent groups selected from the group consisting of an alkoxysilyl group, an aldehyde group, and a boronic acid group, and one or more aromatic rings, the total number of monocyclic aromatic ring structures in the one or more aromatic rings is 2 or greater, the surface modifier A further has one or more functional groups A selected from the group consisting of an epoxy group, an oxetanyl group, and an isocyanate group, and the surface modifier B further has one or more functional groups B selected from the group consisting of a hydroxyl group, —NHR$^T$, a carboxyl group, a thiol group, and a phosphoric acid group. R$^T$ represents a hydrogen atom or an alkyl group.

Requirement 2: The surface-modified inorganic substance includes a surface-modified inorganic substance A containing the inorganic substance and the surface modifier A adsorbed on the surface of the inorganic substance, and not containing the surface modifier B, and a surface-modified inorganic substance B containing the inorganic substance and the surface modifier B adsorbed on the surface of the inorganic substance, and not containing the surface modifier A.

According to the present invention, it is possible to provide a composition for forming a thermally conductive material, from which a thermally conductive material having excellent adhesiveness can be obtained.

Moreover, according to the present invention, it is possible to provide a thermally conductive material and a surface-modified inorganic substance.

DESCRIPTION OF THE PREFERRED EMBODIMENTS

Hereinafter, a composition for forming a thermally conductive material (hereinafter, also simply referred to as a composition), a thermally conductive material, and a surface-modified inorganic substance according to the embodiment of the present invention will be described in detail.

The following constituent elements are described based on the representative embodiments of the present invention in some cases, but the present invention is not limited to such an embodiment.

Moreover, in the present specification, the numerical range expressed using "to" means a range including the numerical values listed before and after "to" as a lower limit value and an upper limit value.

In the present specification, a solid content of the composition means all components except for a solvent in a case where the composition contains the solvent, and as long as the component is a component other than the solvent, the component is considered to be a solid content even in a case where the component is a liquid component.

Furthermore, in the present specification, the description of "(meth)acryloyl group" means "either or both of an acryloyl group and a methacryloyl group". Moreover, the description of "(meth)acrylamide group" means "either or both of an acrylamide group and a methacrylamide group".

In the present specification, an acid anhydride group may be a monovalent group or a divalent group, unless otherwise specified. In a case where the acid anhydride group represents a monovalent group, examples of the monovalent group include a substituent obtained by removing any hydrogen atom from an acid anhydride such as maleic acid anhydride, phthalic acid anhydride, pyromellitic acid anhydride, and trimellitic acid anhydride. Moreover, in a case where the acid anhydride group represents a divalent group, the divalent group means a group represented by *—CO—O—CO—* (* represents a bonding position).

In addition, in the present specification, a substituent or the like, which is not specified whether to be substituted or unsubstituted, may have an additional substituent (for example, a substituent group Y which will be described later), if possible, as long as the desired effect is not impaired. For example, the description of an "alkyl group" means a substituted or unsubstituted alkyl group (alkyl group that may have a substituent) as long as the desired effect is not impaired.

Furthermore, in the present specification, in a case where the description of "may have a substituent" appears, the kind of a substituent, the position of a substituent, and the number of substituents are not particularly limited. Examples of the number of substituents include 1 or 2 or more. Examples of the substituent include a monovalent nonmetallic atomic group excluding a hydrogen atom, and the substituent is preferably a group selected from the following substituent group Y In the present specification, examples of a halogen atom include a chlorine atom, a fluorine atom, a bromine atom, and an iodine atom.

Substituent group Y: a halogen atom (—F, —Br, —Cl, —I, or the like), a hydroxyl group, an amino group, a carboxylic acid group and a conjugated base group thereof, a carboxylic acid anhydride group, a cyanate ester group, an unsaturated polymerizable group, an epoxy group, an oxetanyl group, an aziridinyl group, a thiol group, an isocyanate group, an thioisocyanate group, an aldehyde group, an alkoxy group, an aryloxy group, an alkylthio group, an arylthio group, an alkyldithio group, an aryldithio group, an N-alkylamino group, an N,N-dialkylamino group, an N-arylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acylthio group, an acylamino group, an N-alkylacylamino group, an N-arylacylamino group, a ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, an acyl group, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsufinyl group, an arylsulfinyl group, an alkylsulfonyl group, an arylsulfonyl group, a sulfo group (—SO$_3$H) and a conjugated base group thereof, an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, an N-acylsulfamoyl group and a conjugated base group thereof, an N-alkylsulfonylsulfamoyl group (—$SO_2NHSO_2$(alkyl)) and a conjugated base group thereof, an N-arylsulfonylsulfamoyl group (—$SO_2NHSO_2$(aryl)) and a conjugated base group thereof, an N-alkylsulfonylcarbamoyl group (—$CONHSO_2$(alkyl)) and a conjugated base group thereof, an N-arylsulfonylcarbamoyl group (—$CONHSO_2$(aryl)) and a conjugated base group thereof, an alkoxysilyl group (—Si(Oalkyl)$_3$), an aryloxysilyl group (—Si(Oaryl)$_3$), a hydroxysilyl group (—Si(OH)$_3$) and a conjugated base group thereof, a phosphono group (—$PO_3H_2$) and a conjugated base group thereof, a dialkylphosphono group (—$PO_3$(alkyl)$_2$), a diarylphosphono group (—$PO_3$(aryl)$_2$), an alkylarylphosphono group (—$PO_3$(alkyl)(aryl)), a monoalkylphosphono group (—$PO_3$H(alkyl)) and a conjugated base group thereof, a monoarylphosphono group (—$PO_3$H(aryl)) and a conjugated base group thereof, a phosphonooxy group (—$OPO_3H_2$) and a conjugated base group thereof, a dialkylphosphonooxy group (—$OPO_3$(alkyl)$_2$), a diarylphosphonooxy group (—$OPO_3$(aryl)$_2$), an alkylarylphosphonooxy group (—$OPO_3$(alkyl)(aryl)), a monoalkylphosphonooxy group (—$OPO_3$H(alkyl)) and a conjugated base group thereof, a monoarylphosphonooxy group (—$OPO_3$H(aryl)) and a conjugated base group thereof, a cyano group, a nitro group, an aryl group, an alkenyl group, an alkynyl group, and an alkyl group. Further, each of the aforementioned groups may further have a substituent (for example, one or more groups of each of the aforementioned groups), if possible. For example, an aryl group that may have a substituent is also included as a group that can be selected from the substituent group Y.

In a case where the group selected from the substituent groups Y has a carbon atom, the number of carbon atoms of the group is, for example, 1 to 20.

The number of atoms other than the hydrogen atom of the group selected from the substituent groups Y is, for example, 1 to 30.

Moreover, these substituents may or may not form a ring by being bonded to each other, if possible, or by being bonded to a group substituted with the substituent. For example, the alkyl group (or an alkyl group moiety in a group including an alkyl group as a partial structure, such as an alkoxy group) may be a cyclic alkyl group (cycloalkyl group) or may be an alkyl group having one or more cyclic structures as a partial structure.

[Composition for Forming Thermally Conductive Material (Composition)]

The composition according to an embodiment of the present invention is a composition containing a surface-modified inorganic substance and a thermosetting compound.

The surface-modified inorganic substance satisfies at least one of the following Requirement 1 or Requirement 2.

Requirement 1: The surface-modified inorganic substance includes a surface-modified inorganic substance X containing an inorganic substance and a surface modifier A and a surface modifier B adsorbed on the surface of the inorganic substance, the surface modifier A and the surface modifier B each independently have one or more adsorbent groups selected from the group consisting of an alkoxysilyl group, an aldehyde group, and a boronic acid group, and one or more aromatic rings, the total number of monocyclic aromatic ring structures in the one or more aromatic rings is 2 or greater, the surface modifier A further has one or more functional groups A selected from the group consisting of an epoxy group, an oxetanyl group, and an isocyanate group, and the surface modifier B further has one or more functional groups B selected from the group consisting of a hydroxyl group, —$NHR^T$, a carboxyl group, a thiol group, and a phosphoric acid group. $R^T$ represents a hydrogen atom or an alkyl group.

Requirement 2: The surface-modified inorganic substance includes a surface-modified inorganic substance A containing the inorganic substance and the surface modifier A adsorbed on the surface of the inorganic substance, and not containing the surface modifier B, and a surface-modified inorganic substance B containing the inorganic substance and the surface modifier B adsorbed on the surface of the inorganic substance, and not containing the surface modifier A.

Although the mechanism by which the problem of the present invention is solved by the composition according to the embodiment of the present invention having the aforementioned structure and a thermally conductive material having excellent adhesiveness is obtained is not always clear, the present inventors consider as follows.

As a result of examining the adhesiveness of the existing thermally conductive material, the present inventors have found that in a case where the thermally conductive material is forcibly peeled from the adherend, the thermally conductive material itself is likely to be peeled with aggregation destruction. Therefore, it was estimated that the adhesive strength would be improved in a case where the strength of the thermally conductive material itself was improved so that aggregation destruction was less likely to occur. Therefore, it is considered that the strength of the obtained thermally conductive material is improved and the problem can be solved by containing the surface-modified inorganic substance satisfying the Requirements 1 and/or 2 in the composition of the present invention.

That is, in a case where the surface-modified inorganic substance satisfies the Requirement 1 and includes the surface-modified inorganic substance X containing the surface modifier A and the surface modifier B, the surface modifier A and the surface modifier B have an adsorbent group and two or more monocyclic aromatic ring structure, the surface-modified inorganic substance is firmly and efficiently adsorbed (surface-modified) on the inorganic substance. In addition, since a functional group A in the surface modifier A and a functional group B in the surface modifier B can form a chemical bond with each other, in a case of forming a thermally conductive material using the composition, a chemical bond is formed between the surface-modified inorganic substances X. As a result, it is considered that the inorganic substances (surface-modified inorganic substances) in the thermally conductive material are firmly bonded to each other, the strength of the thermally conductive material is improved, the aggregation destruction of the thermally conductive material is less likely to occur, and the adhesiveness of the thermally conductive material is improved.

In addition, in a case where the surface-modified inorganic substance satisfies the Requirement 2 and includes the surface-modified inorganic substance A containing the surface modifier A and the surface-modified inorganic substance B containing the surface modifier B, in the same manner as described in the Requirement 1, each of the surface modifiers is firmly and efficiently adsorbed (surface-modified) on the inorganic substances in each of the surface-modified inorganic substances. In addition, in a case where the thermally conductive material is formed using the composition, a chemical bond is formed between the functional group A in the surface modifier A of the surface-modified inorganic substance A and the functional group B in the surface modifier B of the surface-modified inorganic substance B. As a result, it is considered that the inorganic substances in the thermally conductive material (inorganic substances in the surface-modified inorganic substance A and the surface-modified inorganic substance B) are firmly bonded to each other, the strength of the thermally conductive material is improved, the aggregation destruction of the thermally conductive material is less likely to occur, and the adhesiveness of the thermally conductive material is improved.

Hereinafter, the components contained in the composition will be described in detail.

[Surface-Modified Inorganic Substance]

The composition according to an embodiment of the present invention contains a surface-modified inorganic substance.

In the present invention, the surface-modified inorganic substance includes the surface-modified inorganic substance X, or the surface-modified inorganic substance A and the surface-modified inorganic substance B.

In the present invention, the surface-modified inorganic substance satisfies at least one of the following Requirement 1 or Requirement 2.

Requirement 1: The surface-modified inorganic substance includes a surface-modified inorganic substance X containing an inorganic substance, and a surface modifier A and a surface modifier B adsorbed on a surface of the inorganic substance, the surface modifier A and the surface modifier B each independently have one or more adsorbent groups selected from the group consisting of an alkoxysilyl group, an aldehyde group, and a boronic acid group, and one or more aromatic rings, the total number of monocyclic aromatic ring structures in the one or more aromatic rings is 2 or greater, the surface modifier A further has one or more functional groups A selected from the group consisting of an epoxy group, an oxetanyl group, and an isocyanate group, and the surface modifier B further has one or more functional groups B selected from the group consisting of a hydroxyl group, —$NHR^T$, a carboxyl group, a thiol group, and a phosphoric acid group. $R^T$ represents a hydrogen atom or an alkyl group.

Requirement 2: The surface-modified inorganic substance includes a surface-modified inorganic substance A containing the inorganic substance and the surface modifier A adsorbed on the surface of the inorganic substance, and not containing the surface modifier B, and a surface-modified inorganic substance B containing the inorganic substance and the surface modifier B adsorbed on the surface of the inorganic substance, and not containing the surface modifier A.

First, the components contained in the surface-modified inorganic substance (surface-modified inorganic substance X, surface-modified inorganic substance A, or surface-modified inorganic substance B) will be described in detail, and then the production method thereof and the like will be described in detail.

<Inorganic Substance>

Surface-modified inorganic substances contain an inorganic substance.

As the inorganic substance, for example, any inorganic substances, which have been used in an inorganic filler of a thermally conductive material in the related art, may be used.

The inorganic substances in the surface-modified inorganic substances (surface-modified inorganic substance X, surface-modified inorganic substance A, and/or surface-modified inorganic substance B) preferably includes an inorganic nitride or inorganic oxide, and more preferably includes an inorganic nitride, from the viewpoint that thermally conductive property and insulating properties of the thermally conductive material are superior.

A shape of the inorganic substance is not particularly limited, and may be a granule shape, may be a film shape, or may be a plate shape. Examples of the shape of the granular inorganic substance include a rice grain shape, a spherical shape, a cubical shape, a spindle shape, a scale shape, an aggregation shape, and an amorphous shape.

Examples of the inorganic oxide include zirconium oxide ($ZrO_2$), titanium oxide ($TiO_2$), silicon oxide ($SiO_2$), aluminum oxide ($Al_2O_3$), iron oxide ($Fe_2O_3$, FeO, or $Fe_3O_4$), copper oxide (CuO or $Cu_2O$), zinc oxide (ZnO), yttrium oxide ($Y_2O_3$), niobium oxide ($Nb_2O_5$), molybdenum oxide ($MoO_3$), indium oxide ($In_2O_3$ or $In_2O$), tin oxide ($SnO_2$), tantalum oxide ($Ta_2O_5$), tungsten oxide ($WO_3$ or $W_2O_5$), lead oxide (PbO or $PbO_2$), bismuth oxide ($Bi_2O_3$), cerium oxide ($CeO_2$ or $Ce_2O_3$), antimony oxide ($Sb_2O_3$ or $Sb_2O_5$), germanium oxide ($GeO_2$ or GeO), lanthanum oxide ($La_2O_3$), and ruthenium oxide ($RuO_2$).

Only one kind of inorganic oxides may be used, or two or more kinds thereof may be used.

The inorganic oxide is preferably titanium oxide, aluminum oxide, or zinc oxide, and more preferably aluminum oxide.

The inorganic oxide may be an oxide which is produced by oxidizing a metal prepared as a nonoxide in an environment or the like.

Examples of the inorganic nitride include boron nitride (BN), carbon nitride ($C_3N_4$), silicon nitride ($Si_3N_4$), gallium nitride (GaN), indium nitride (InN), aluminum nitride (AlN), chromium nitride ($Cr_2N$), copper nitride ($Cu_3N$), iron nitride ($Fe_4N$), iron nitride ($Fe_3N$), lanthanum nitride (LaN), lithium nitride ($Li_3N$), magnesium nitride ($Mg_3N_2$), molybdenum nitride ($Mo_2N$), niobium nitride (NbN), tantalum nitride (TaN), titanium nitride (TiN), tungsten nitride ($W_2N$), tungsten nitride ($WN_2$), yttrium nitride (YN), and zirconium nitride (ZrN).

The inorganic nitride preferably contains an aluminum atom, a boron atom, or a silicon atom, more preferably contains aluminum nitride, boron nitride, or silicon nitride, even more preferably contains aluminum nitride or boron nitride, and particularly preferably contains boron nitride.

Only one kind of inorganic nitrides may be used, or two or more thereof may be used.

A size of the inorganic substance is not particularly limited, but from the viewpoint that the dispersibility of the inorganic substance is superior, an average particle diameter of the inorganic substances is preferably 500 µm or less, more preferably 300 µm or less, and even more preferably 200 µm or less. The lower limit thereof is not particularly limited, but is preferably 10 nm or greater and more preferably 100 nm or greater, from the viewpoint of handleability.

For the average particle diameter of the inorganic substances, in a case where a commercial product is used, the value listed in the catalog is adopted. In a case where a value is not listed in the catalog, the average particle diameter is obtained by randomly selecting 100 pieces of inorganic substances using an electron microscope, measuring particle diameters (long diameter) of the respective inorganic substances, and determining the arithmetic mean thereof.

Only one kind of inorganic substances may be used, or two or more kinds thereof may be used.

The inorganic substance preferably includes at least one of an inorganic nitride or an inorganic oxide, and more preferably includes at least an inorganic nitride.

The inorganic nitride preferably includes at least one of boron nitride or aluminum nitride, and more preferably includes at least boron nitride.

A content of the inorganic nitride (preferably boron nitride) in the inorganic substance is preferably 10% by mass or greater, more preferably 50% by mass or greater, and even more preferably 80% by mass or greater, with respect to the total mass of the inorganic substance.

The upper limit thereof is 100% by mass or less.

The inorganic oxide is preferably aluminum oxide.

From the viewpoint that the thermally conductive properties of the thermally conductive material are superior, the composition more preferably contains at least inorganic substances having an average particle diameter of 20 μm or greater (preferably, 40 μm or greater).

A content of the inorganic substance in the composition is preferably 40% to 95% by mass, more preferably 50% to 95% by mass, and even more preferably 60% to 95% by mass, with respect to the total solid content of the composition.

The content of the inorganic substance in the surface-modified inorganic substance (surface-modified inorganic substance X, surface-modified inorganic substance A, or surface-modified inorganic substance B) is preferably 90% by mass or greater, more preferably 99% by mass or greater, and even more preferably 99.9% by mass or greater, with respect to the total mass of the surface-modified inorganic substance. The upper limit is less than 100% by mass, and preferably 99.9999% by mass or less.

<Surface Modifier>

The surface modifier (surface modifier A and surface modifier B) is a component which modifies a surface of the aforementioned inorganic substance (for example, an inorganic nitride and/or an inorganic oxide).

In the present specification, "surface modification" means a state where an organic substance is adsorbed onto at least a part of a surface of the inorganic substance. A form of the adsorption is not particularly limited, and may be in a bonded state. That is, the surface modification also includes a state in which an organic group obtained by desorbing a part of an organic substance (for example, a part or all of an adsorbent group described later) is bonded to the surface of the inorganic substance. The bond may be any one of a covalent bond, a coordinate bond, an ionic bond, a hydrogen bond, a van der Waals bond, or a metallic bond. The surface modification may be performed so that a monolayer is formed on at least a portion of the surface. The monolayer is a single-layer film formed by chemical adsorption of organic molecules, and is known as a self-assembled monolayer (SAM). Moreover, in the present specification, the surface modification may be performed only on a portion of the surface of the inorganic substance, or may be performed on the entire surface thereof. In the present specification, a "surface-modified inorganic substance" means an inorganic substance of which the surface is modified with a surface modifier, that is, a matter in which an organic substance is adsorbed onto a surface of an inorganic substance.

The surface modifier may be a surface modifier for an inorganic nitride (surface modifier for an inorganic nitride), or a surface modifier for an inorganic oxide (surface modifier for an inorganic oxide).

That is, in the composition according to an embodiment of the present invention, the inorganic substance may form a surface-modified inorganic substance (preferably, a surface-modified inorganic nitride and/or a surface-modified inorganic oxide) in cooperation with the surface modifier.

(Surface Modifier A)

The surface modifier A has one or more adsorbent groups selected from the group consisting of an alkoxysilyl group, an aldehyde group (—CHO), and a boronic acid group (—B(OH)$_2$).

Examples of the alkoxysilyl group include a group represented by General Formula (AD1).

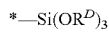     General Formula (AD1):

In General Formula (AD1), $R^D$'s each independently represent an alkyl group (including all of a linear alkyl group, a branched alkyl group, and a cyclic alkyl group). * represents a bonding position.

The alkyl group represented by $R^D$ is, for example, an alkyl group having 1 to 10 carbon atoms, preferably having 1 to 6 carbon atoms, and more preferably having 1 to 3 carbon atoms.

Moreover, the alkyl group may further have a substituent (for example, the substituent group Y).

Specific examples of the alkoxysilyl group include a trimethoxysilyl group and a triethoxysilyl group.

The surface modifier A may have one kind of adsorbent groups alone or two or more kinds thereof.

The number of adsorbent groups in the surface modifier A is preferably 1 to 5, and more preferably 1 to 2.

The surface modifier A has one or more aromatic rings, and the total number of monocyclic aromatic ring structures in the one or more aromatic rings is two or greater.

Here, in a case where the surface modifier A has a polycyclic aromatic ring, "the total number of monocyclic aromatic ring structures in one or more aromatic rings is two or greater" means that the surface modifier A has a total of two or more monocyclic aromatic ring structures by individually counting the aromatic ring structures of each monocyclic ring constituting the polycyclic aromatic rings. For example, in a case where the surface modifier A has a naphthalene ring group, a monocyclic aromatic ring structure of 2 is counted based on the naphthalene ring group. In addition, for example, in a case where the surface modifier A has a partial structure represented by "benzene ring-O—(CH$_2$)$_3$—O-naphthalene ring", a monocyclic aromatic ring structure of 3 is counted based on the partial structure.

The aromatic ring may contain one or more (preferably 1 to 3) heteroatoms (nitrogen atom, sulfur atom, oxygen atom, selenium atom, tellurium atom, phosphorus atom, silicon atom, and/or boron atom) as ring member atoms, or may not contain thereof. That is, the aromatic ring may be an aromatic hydrocarbon ring, or may be an aromatic heterocyclic ring.

The aromatic ring may be a monocyclic aromatic ring, or may be a polycyclic aromatic ring.

The number of ring members of the monocyclic aromatic ring is preferably 5 to 10, and more preferably 5 or 6.

Examples of the monocyclic aromatic ring include a benzene ring, a frill ring, a pyridine ring, a pyrazine ring, a pyrimidine ring, a pyridazine ring, a triazine ring, an oxazole ring, a thiazole ring, an imidazole ring, a pyrazole ring, an isoxazole ring, an isothiazole ring, an oxadiazole ring, a thiadiazole ring, a triazole ring, a tetrazole ring, a thiophene ring, a selenophene ring, and a pyrrole ring.

Among them, the monocyclic aromatic ring is preferably a benzene ring or a triazine ring.

One kind of the aromatic rings may be used singly, or two or more kinds thereof may be used.

The polycyclic aromatic ring preferably contains two or more monocyclic aromatic hydrocarbon ring structures, more preferably two or more benzene ring structures, and even more preferably three or more benzene ring structures. The upper limit of the number of monocyclic aromatic ring structures contained in the polycyclic aromatic ring is not particularly limited, but is 10 or less in many cases, for example.

Examples of the polycyclic aromatic ring include a naphthalene ring, an indacene ring, an acenaphthylene ring, a fluorene ring, a phenalene ring, a phenanthrene ring, an anthracene ring, a fluoranthene ring, acephenanthrene ring, aceanthrene ring, pyrene ring, and chrysene ring, a tetracene ring, a pleiaden ring, a picene ring, a perylene ring, a pentaphene ring, a pentacene ring, a tetraphenylene ring, a hexaphene ring, and a triphenylene ring.

Among them, the polycyclic aromatic ring is preferably a naphthalene ring, a pyrene ring, or a perylene ring, more preferably a pyrene ring or a perylene ring, and even more preferably a pyrene ring.

The aromatic ring may or may not have a non-aromatic ring condensed.

From the viewpoint that the effect of the present invention is superior, the total number of monocyclic aromatic ring structures in the surface modifier A is preferably 3 or greater, and more preferably 4 or greater. The upper limit of the total number of monocyclic aromatic ring structures is not particularly limited, but is 12 or less in many cases.

The surface modifier A further has one or more functional groups A selected from the group consisting of an epoxy group, an oxetanyl group, and an isocyanate group (—NCO).

The epoxy group is a group formed by removing one or two or more hydrogen atoms (preferably one hydrogen atom) from the oxirane ring. If possible, the epoxy group may further have a substituent (a linear or branched alkyl group having 1 to 5 carbon atoms).

In addition, the oxetanyl group is a group formed by removing one or two or more hydrogen atoms (preferably one hydrogen atom) from the oxetane ring. The oxetanyl group may further have a substituent, if possible.

The surface modifier A may have one kind of the functional groups A alone, or may have two or more kinds thereof.

The number of functional groups A in the surface modifier A is preferably 1 to 5, and more preferably 1 to 2.

In addition, the surface modifier A preferably does not have a functional group B described later.

General Formula (Aa)

The surface modifier A is preferably a compound represented by General Formula (Aa).

$[P^a\text{-}L^{Pa}\text{-}]_{ma} Q^a [\text{-}L^{Ra}\text{-}R^{Aa}]_{na}$ (Aa)

In General Formula (Aa), ma represents an integer of 1 to 3.

In General Formula (Aa), na represents an integer of 1 to 3.

In General Formula (Aa), $Q^a$ represents an aromatic ring group having a (na+ma) valence.

The aromatic ring group may contain one or more (preferably 1 to 3) heteroatoms (nitrogen atom, sulfur atom, oxygen atom, selenium atom, tellurium atom, phosphorus atom, silicon atom, and/or boron atom) as ring member atoms), or may not contain thereof. The number of ring members of the aromatic ring group is preferably 5 to 18.

The aromatic ring group may be a monocyclic aromatic ring group, may be a polycyclic aromatic ring group, and is preferably a polycyclic aromatic ring group.

Examples of the monocyclic aromatic ring group include a benzene ring group, a frill ring group, a pyridine ring group, a pyrazine ring group, a pyrimidine ring group, a pyridazine ring group, a triazine ring group, an oxazole ring group, a thiazole ring group, an imidazole ring group, a pyrazole ring group, an isoxazole ring group, an isothiazole ring group, an oxadiazole ring group, a thiadiazole ring group, a triazole ring group, a tetrazole ring group, a thiophene ring group, a selenophene ring group, and a pyrrole ring group.

The polycyclic aromatic ring group is preferably a polycyclic aromatic ring group containing two or more monocyclic aromatic hydrocarbon ring structures, more preferably a polycyclic aromatic ring group containing two or more benzene ring structures, and even more preferably a polycyclic aromatic ring group containing three or more benzene ring structures. The upper limit of the number of monocyclic aromatic ring structures contained in the polycyclic aromatic ring group is not particularly limited, but is 10 or less in many cases, for example.

Examples of the polycyclic aromatic ring group include a naphthalene ring group, an indacene ring group, an acenaphthylene ring group, a fluorene ring group, a phenalene ring group, a phenanthrene ring group, an anthracene ring group, a fluoranthene ring group, an acephenanthrene ring, an aceanthrene ring, a pyrene ring group, a chrysene ring group, a tetracene ring group, a pleiaden ring group, a picene ring group, a perylene ring group, a pentaphene ring group, a pentacene ring group, a tetraphenylene ring group, a hexaphene ring group, and a triphenylene ring group.

Among them, the polycyclic aromatic ring group is preferably a naphthalene ring group or a pyrene ring group, and more preferably a pyrene ring group.

The aromatic ring group may or may not have a substituent. Substituents referred to here are intended to mean substituents other than the groups specified in the general formula (in General Formula (Aa), $[P^a\text{-}L^{Pa}\text{-}]$ and $[\text{-}L^{Ra}\text{-}R^{Aa}]$) Hereinafter, in a case where the same expression is used in the description of the surface modifier, the same intention is given.

The aromatic ring group may or may not further have a non-aromatic ring condensed.

In General Formula (Aa), $P^a$ represents an adsorbent group (alkoxysilyl group, aldehyde group, or boronic acid group).

The adsorbent group has already been described.

In General Formula (Aa), $L^{Pa}$ represents a single bond or a divalent linking group.

The divalent linking group may contain an aromatic ring.

Examples of the divalent linking group include —O—, —S—, —NR$^F$— (R$^F$ represents a hydrogen atom or an alkyl group), a divalent hydrocarbon group (for example, alkylene group (preferably 1 to 6 carbon atoms), alkenylene group (—CH=CH— and the like, preferably, 2 to 6 carbon atoms), alkynylene group (—C≡C— and the like, preferably, 2 to 6 carbon atoms), and arylene group (phenylene group and the like, preferably, 6 to 15 carbon atoms)), carbonate group (—O—CO—O—), carbodiimide group (—N=C=N—), acid anhydride group (—CO—O—CO—), ester group (—CO—O— or —O—CO—), carbonyl group (—CO—), imide ester group (—C(=NR$^C$)—O— or —O—C(=NR$^C$)—, R$^C$ represents a hydrogen atom or an alkyl group), and a group obtained by combining these groups.

The alkylene group, alkenylene group, and alkynylene group may be linear or branched, and may have a cyclic structure entirely or partially.

Examples of the combined groups include "-(divalent hydrocarbon group)-$X^{111}$—", "—$X^{111}$-(divalent hydrocarbon group)-", "—$X^{111}$-(divalent hydrocarbon group)-$X^{111}$—", "-(divalent hydrocarbon group)-$X^{111}$-(divalent hydrocarbon group)-", "—$X^{111}$-(divalent hydrocarbon group)-$X^{111}$-(divalent hydrocarbon group)-", "-(divalent hydrocarbon group)-$X^{111}$-(divalent hydrocarbon group)-$X^{111}$-", "—$X^{111}$-(divalent hydrocarbon group)-$X^{111}$-(divalent hydrocarbon group)-$X^{111}$—", "-(divalent hydrocarbon group)-$X^{111}$-(divalent hydrocarbon group)-$X^{111}$-(divalent hydrocarbon group)-", "-(divalent hydrocarbon group)-$X^{111}$-(divalent hydrocarbon group)-$X^{111}$-(divalent hydrocarbon group)-$X^{111}$—", and "—$X^{111}$-(divalent hydrocarbon group)-$X^{111}$-(divalent hydrocarbon group)-$X^{111}$-(divalent hydrocarbon group)-".

In addition, —$X^{111}$— is —O—, —S—, —$NR^F$—, a carbonate group, a carbodiimide group, an acid anhydride group, an ester group, a carbonyl group, an imide ester group, or a group obtained by combining these groups.

The total number of carbon atoms in the combined group is preferably 1 to 20, and more preferably 1 to 12.

In a case where there are a plurality of —$X^{111}$—'s and/or divalent hydrocarbon groups in the above combined groups, the plurality of —$X^{111}$—'s and/or divalent hydrocarbon groups may be the same as or different from each other.

The divalent linking group may further have a substituent if possible, and such a substituent may include an adsorbent group, a functional group A, and/or a functional group B (for the functional group B will be described later). In this case, the substituent may be the functional group A and/or the functional group B itself. The substituent preferably does not include a functional group B.

In General Formula (Aa), $R^{Aa}$ represents a functional group A (epoxy group, oxetanyl group, or isocyanate group).

The functional group A has already been described.

In General Formula (Aa), $L^{Ra}$ represents a single bond or a divalent linking group.

As an examples of the divalent linking group in $L^{Ra}$, the group exemplified as an example of the divalent linking group in $L^{Pa}$ is similarly exemplified.

The total number of monocyclic aromatic ring structures included in ma pieces of $L^{Pa}$, $Q^a$, and na pieces of $L^{Ra}$ in General Formula (Aa) is 2 or greater, preferably 3 or greater, and more preferably 4 or greater. The upper limit is 12 or less in many cases, for example.

In a case where there are a plurality of $P^a$'s, $L^{Pa}$'s, $R^{Aa}$'s, and/or $L^{Ra}$'s in General Formula (Aa), the plurality of $P^a$'s, $L^{Pa}$'s, $R^{Aa}$'s, and/or $L^{Ra}$'s may be the same as or different from each other.

General Formula (Ab)

The surface modifier A is preferably a compound represented by General Formula (Ab).

$$Y^b—[-(L^b)_{mb}-Z^{Ab}]_{nb} \quad (Ab)$$

In General Formula (Ab), mb represents an integer of 0 or greater (preferably, 0 to 10), and in a case where mb is 0, $Y^b$ is directly bonded to $X^b$.

In General Formula (Ab), nb represents an integer of 3 to 6.

In General Formula (Ab), $Y^b$ represents an aromatic ring group.

As the aromatic ring group, the aromatic ring group described in General Formula (Aa) can be similarly applied.

For $Y^b$, a monocyclic aromatic ring group is preferable, a benzene ring group or a triazine ring group is more preferable, and a triazine ring group is even more preferable.

The aromatic ring group may or may not have a substituent.

In General Formula (Ab), $L^b$ represents an arylene group, an ester group, an ether group, a thioester group, a thioether group, a carbonyl group, —$NR^N$— ($R^N$ represents a hydrogen atom or substituent), an azo group, which may have a substituent, or an unsaturated hydrocarbon group which may have a substituent (vinylene group, —C≡C—, and the like).

In General Formula (Ab), $Z^{Ab}$ represents "an aromatic ring group that has a substituent $R^a$ containing one or both of adsorbent group (alkoxysilyl group, aldehyde group and/or boronic acid group) and functional group A (epoxy group, oxetanyl group, and/or isocyanate group)".

The aromatic ring group may or may not have a substituent other than the substituent $R^a$.

As the aromatic ring group, the aromatic ring group described in General Formula (Aa) can be similarly applied, and among them, a benzene ring group or a naphthalene ring group is preferable.

The substituent $R^a$ may be a substituent $R^{a1}$ containing an adsorbent group and not containing a functional group A. The substituent $R^{a1}$ may be a group partially containing an adsorbent group, or may be an adsorbent group itself.

The substituent $R^a$ may be a substituent $R^{a2}$ containing the functional group A and not containing the adsorbent group. The substituent $R^{a2}$ may be a group partially containing a functional group A, or may be a functional group A itself.

The substituent $R^a$ may be a substituent $R^{a3}$ containing both of an adsorbent group and a functional group A.

The aromatic ring group in $Z^{Ab}$ may have any one kind of the substituent $R^{a1}$, the substituent $R^{a2}$, or the substituent $R^{a3}$, or may have two or more kinds thereof.

However, General Formula (Ab) satisfies one or both requirements of "at least one of the substituent $R^{a1}$ or the substituent $R^{a2}$ is present (Requirement a1)" and "at least one of the substituent $R^{a1}$ is present (Requirement a2)" with respect to a plurality of the substituents $R^a$ present therein.

Among them, in General Formula (Ab), both of "$Z^{Ab}$ that is an aromatic ring group having only the substituent $R^{a1}$ among the substituent $R^{a1}$, the substituent $R^{a2}$, and the substituent $R^{a3}$", and "$Z^{Ab}$ that is an aromatic ring group having only the substituent $R^{a2}$ among the substituent $R^{a1}$, the substituent $R^{a2}$, and the substituent $R^{a3}$" are preferably present.

The substituent $R^a$ (substituent containing one or both of the adsorbent group and the functional group A) is preferably a group represented by General Formula (RAb).

(RAb)

In General Formula (RAb), * represents a bonding position.

In General Formula (RAb), T represents a single bond or a divalent linking group.

Examples of the divalent linking group include —O—, —S—, —CO—, —$NR^N$—, —$SO_2$—, an alkylene group, and a group obtained by combining these groups. $R^N$ in —$NR^N$— represents a hydrogen atom or a substituent. The alkylene group is preferably a linear or branched alkylene group having 1 to 8 carbon atoms.

Among them, T is preferably a "single bond" or a "group obtained by a combination selected from the group consisting of —O—, —CO—, and an alkylene group", and more preferably a single bond, $*^A$-alkylene group-O—CO—$*^B$, $*^A$—CO—O-alkylene group-$*^B$, $*^A$-O-alkylene group-O—$*^B$, $*^A$-CO—O-alkylene group-O—CO—$*^B$, $*^A$-CO—O-alkylene group-O—$*^B$, or $*^A$-O-alkylene group-O—CO—$*^B$.

$*^A$ is a bonding position on a side opposite to U, and $*^{13}$ is a position bonded to U.

In General Formula (RAb), U represents an aromatic ring group which may have a substituent, or a cycloalkane ring group which may have a substituent (preferably having 3 to 15 carbon atoms).

U is bonded to T, $V^A$, and $W^A$ via a ring member atom of the aromatic ring group or the cycloalkane ring group.

As the aromatic ring group in U, the aromatic ring group described in General Formula (Aa) can be similarly applied.

The cycloalkane ring group in U may be monocyclic or polycyclic.

The number of membered rings in the cycloalkane ring group is preferably 6 to 10.

The number of carbon atoms, which are ring member atoms, in the cycloalkane ring group is preferably 4 to 20, and more preferably 6 to 12. The number of carbon atoms, which are ring member atoms, is intended to mean the number of carbon atoms which are ring member atoms constituting a cycloalkane ring.

In a case where the cycloalkane ring group has a plurality of substituents, and the plurality of substituents are bonded to each other to form a ring other than the cycloalkane ring, the number of carbon atoms contained only in the ring other than the cycloalkane ring is not counted in the number of carbon atoms which are ring member atoms. Moreover, carbon atoms shared by the cycloalkane ring and the ring other than the cycloalkane ring in the cycloalkane ring group are counted as the number of carbon atoms which are ring member atoms.

In General Formula (RAb), $V^A$ and a plurality of $W^A$'s each independently represent an adsorbent group-containing group or a functional group A-containing group.

The adsorbent group-containing group means an adsorbent group (alkoxysilyl group, aldehyde group, or boronic acid group) or a monovalent group having an adsorbent group.

The monovalent group having an adsorbent group is preferably a group represented by "-$L^{eo}$-adsorbent group". $L^{eo}$ is a divalent linking group. The divalent linking group in $L^{eo}$ is preferably an oxygen atom, an alkylene group (preferably a linear or branched alkylene group having 1 to 6 carbon atoms), or a group obtained by combining these groups.

The functional group A-containing group means a functional group A (epoxy group, oxetanyl group, or isocyanate group) or a monovalent group having a functional group A. The monovalent group having a functional group A is preferably a group represented by "-$L^{eo}$-functional group A", and more preferably a group represented by "-$L^{eo}$-(epoxy group or oxetanyl group)". The meaning of $L^{eo}$ is as described above. Among them, the group represented by "-$L^{eo}$-(epoxy group or oxetanyl group)" is preferably "—O-alkylene group-epoxy group" or "—O-alkylene group-oxetanyl group".

All groups of $V^A$ and a plurality of $W^A$'s in General Formula (RAb) may be adsorbent group-containing groups, all groups thereof may be functional group A-containing groups, or the adsorbent group-containing group and the functional group A-containing group may be mixed.

That is, the group represented by General Formula (RAb) may be a substituent $R^{a1}$ (a group including an adsorbent group and not including a functional group A), or may be a substituent $R^{a2}$ (a group including a functional group A and not including an adsorbent group), or may be a substituent $R^{a3}$ (a group including both of an adsorbent group and a functional group A).

In General Formula (RAb), p represents an integer of 0 or greater.

Among them, p is preferably 0 to 5, and more preferably 0 to 1.

In General Formula (RAb), q represents an integer of 0 to 2.

Among them, q is preferably 0 to 1.

In General Formula (Ab), in a case where there are a plurality of groups represented by General Formula (RAb), the plurality of groups represented by General Formula (RAb) may be the same as or different from each other.

In addition, in General Formula (RAb), in a case where there are a plurality of T's, U's, $V^A$'s, $W^A$'s, and/or q's, the plurality of T's, U's, $V^A$'s, $W^A$'s, and/or q's may be the same as or different from each other.

In General Formula (Ab), in a case where there are a plurality of $L^b$'s, mb's, and/or $Z^{Ab}$'s, the plurality of $L^b$'s, mb's, and/or $Z^{Ab}$'s may be the same as or different from each other.

General Formula (Ab2)

Among them, the compound represented by General Formula (Ab) is preferably a compound represented by General Formula (Ab2).

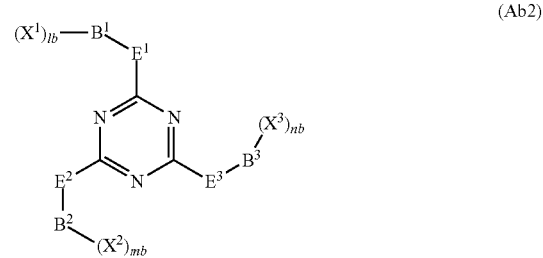

In General Formula (Ab2), $E^1$ to $E^3$ each independently represent a single bond, —NH—, or —NR—.

R represents a substituent (preferably, a linear or branched alkyl group having 1 to 5 carbon atoms). In a case where there are a plurality of —NR—'s among $E^1$ to $E^3$, R's present in a plurality of numbers may be the same as or different from each other.

Among them, from the viewpoint that the thermally conductive property of the obtained thermally conductive material is superior, $E^1$ to $E^3$ are each independently preferably a single bond or —NH—. The reason for this is considered to be that in a case where $E^1$ to $E^3$ are the aforementioned group, an interaction between the compound represented by General Formula (Ab2) and the inorganic substance (in particular, the inorganic nitride) is further enhanced.

In General Formula (Ab2), $B^1$ to $B^3$ each independently represent an aromatic ring group which may have a substituent.

As the aromatic ring group, the aromatic ring group described in General Formula (Aa) can be similarly applied, and among them, a benzene ring group or a naphthalene ring group is preferable.

In General Formula (Ab2), lb, mb, and nb each independently represent an integer of 0 or greater.

lb, mb, and nb are each independently preferably 0 to 5, and more preferably 1 to 2.

For example, in a case where mb is 0, the compound represented by General Formula (Ab2) is a compound represented by the following general formula.

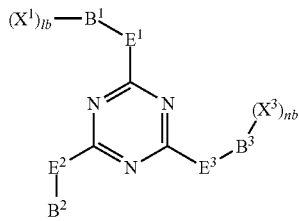

In a case where lb is 2 or greater (that is, in a case where there are a plurality of $X^1$'s), $X^1$'s present in a plurality of numbers (lb pieces) may be the same as or different from each other. In a case where mb is 2 or greater (that is, in a case where there are a plurality of $X^2$'s), $X^2$'s present in a plurality of numbers (mb pieces) may be the same as or different from each other. In a case where nb is 2 or greater (that is, in a case where there are a plurality of $X^3$'s), $X^3$'s present in a plurality of numbers (nb pieces) may be the same as or different from each other.

In General Formula (Ab2), $X^1$ to $X^3$ each independently represent a group represented by General Formula (RAb).

That is, in General Formula (Ab2), there are a total of "lb+mb+nb" pieces of groups represented by General Formula (RAb). "lb+mb+nb" is 1 or greater (preferably 2 to 10, more preferably 3 to 6).

For example, lb is preferably 1 or greater (more preferably 1 to 2), mb is preferably 1 or greater (more preferably 1 to 2), and nb is preferably 1 or greater (more preferably 1 and 2).

General Formula (Ab2) satisfies one or both of "at least one of a group represented by General Formula (RAb) which is a substituent $R^{a1}$ or a group represented by General Formula (RAb) which is a substituent $R^{a2}$ is present (Requirement a3)" and "at least one of a group represented by General Formula (RAb) which is a substituent $R^{a3}$ is present (Requirement a4)" with respect to groups represented by General Formula (RAb) present in "lb+mb+nb" pieces.

Among them, in General Formula (Ab2), "$X^1$ is a group represented by General Formula (RAb) which is a substituent $R^{a1}$, $X^3$ is a group represented by General Formula (RAb) which is a substituent $R^{a2}$" is preferable, and "$X^1$ is a group represented by General Formula (RAb) which is a substituent $R^{a1}$, and $X^2$ and $X^3$ are groups represented by General Formula (RAb) which is a substituent $R^{a2}$" is more preferable.

General Formula (Ab3), General Formula (Ab4)

Among them, the compound represented by General Formula (Ab) is more preferably a compound represented by General Formula (Ab3) or a compound represented by General Formula (Ab4).

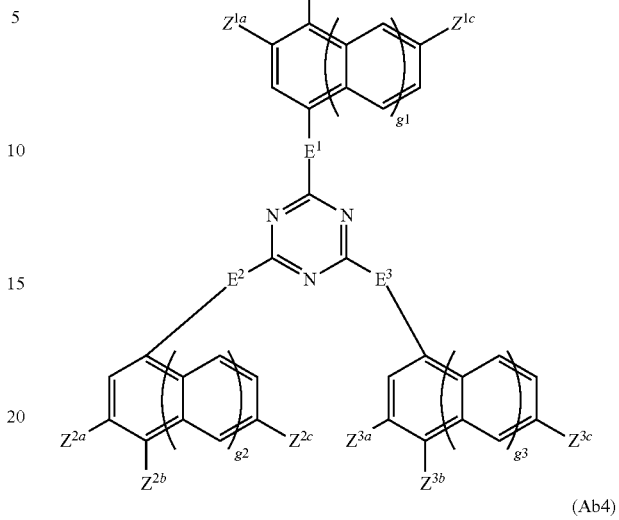

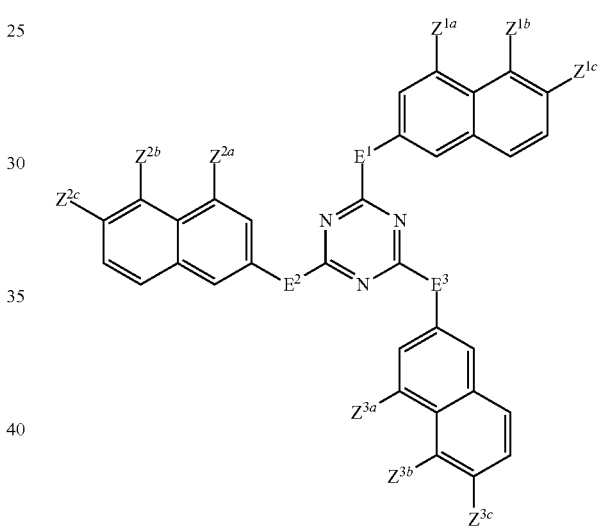

In General Formula (Ab3) and General Formula (Ab4), $E^1$ to $E^3$ each independently represent a single bond, —NH—, or —NR—. R represents a substituent.

$E^1$ to $E^3$ in General Formula (Ab3) and General Formula (Ab4) are the same as $E^1$ to $E^3$ in General Formula (Ab2), respectively.

In General Formula (Ab3) and General Formula (Ab4), $g^1$ to $g^3$ each independently represent an integer of 0 or 1.

In General Formula (Ab3) and General Formula (Ab4), $Z^{1a}$ to $Z^{1c}$, $Z^{2a}$ to $Z^{2c}$, and $Z^{3a}$ to $Z^{3c}$ each independently represent a hydrogen atom or a group represented by General Formula (RAb).

Here, a total of two or more (preferably 2 to 9, and more preferably 3 to 6) among $Z^{1a}$ to $Z^{1c}$, $Z^{2a}$ to $Z^{2c}$, and $Z^{1a}$ to $Z^{3c}$ are the groups represented by General Formula (RAb).

The groups represented by General Formula (RAb) are as described above.

At least one (preferably 1 to 2) of $Z^{1a}$, $Z^{1b}$, or $Z^{1c}$ is preferably a group represented by General Formula (RAb), at least one (preferably 1 to 2) of $Z^{2a}$, $Z^{2b}$, or $Z^{2c}$ is preferably a group represented by General Formula (RAb), and at least one (preferably 1 to 2) of $Z^{3a}$, $Z^{3b}$, or $Z^{3c}$ is preferably a group represented by General Formula (RAb).

In addition, General Formula (Ab3) and General Formula (Ab4) satisfy one or both of "at least one of a group represented by General Formula (RAb) which is a substituent $R^{a1}$ or a group represented by General Formula (RAb) which is a substituent $R^{a2}$ is present (Requirement a5)" and "at least one of a group represented by General Formula (RAb) which is a substituent $R^{a3}$ is present (Requirement a6)" with respect to a group represented by General Formula (RAb), which is present in 2 to 9 pieces.

Among them, in General Formula (Ab3) and General Formula (Ab4), "$Z^{1a}$ to $Z^{1c}$ are each independently a group represented by General Formula (RAb) which is a hydrogen atom or substituent $R^{a1}$, and $Z^{3a}$ to $Z^{3c}$ are each independently a group represented by General Formula (RAb) which is a hydrogen atom or substituent $R^{a2}$" is preferable, and "$Z^{1a}$ to $Z^{1c}$ are each independently a group represented by General Formula (RAb), which is a hydrogen atom or substituents $R^{a1}$, and $Z^{2a}$ to $Z^{2c}$ and $Z^{3a}$ to $Z^{3c}$ are each independently a group represented General Formula (RAb) which is a hydrogen atom or substituent $R^{a2}$" is more preferable.

One kind of the surface modifiers A may be used singly, or two or more kinds thereof may be used.

(Surface Modifier B)

A surface modifier B is, for example, a compound in which the functional group A in the surface modifier A is substituted with the functional group B described later.

The surface modifier B has one or more adsorbent groups selected from the group consisting of an alkoxysilyl group, an aldehyde group (—CHO), and a boronic acid group (—B(OH)$_2$).

The adsorbent group is the same as the adsorbent group described in the description regarding the surface modifier A.

The surface modifier B may have one kind of the adsorbent groups alone or two or more kinds thereof.

The number of adsorbent groups in the surface modifier B is preferably 1 to 5, and more preferably 1 to 2.

The surface modifier B has one or more aromatic rings, and the total number of monocyclic aromatic ring structures in the one or more aromatic rings is two or greater.

The aromatic ring is the same as the aromatic ring described in the description regarding the surface modifier A.

The meaning of "the total number of monocyclic aromatic ring structures in one or more aromatic rings is two or more" is the same as described in the description regarding the surface modifier A.

From the viewpoint that the effect of the present invention is superior, the total number of monocyclic aromatic ring structures in the surface modifier B is preferably 3 or more, and more preferably 4 or greater. The upper limit of the total number of monocyclic aromatic ring structures is not particularly limited, but is 12 or less in many cases.

The surface modifier B has one or more functional group B selected from the group consisting of a hydroxyl group (—OH), —NHR$^T$, a carboxyl group (—COOH), a thiol group (—SH), and a phosphate group (—OP(=O)(OH)$_2$).

R$^T$ in —NHR$^T$ represents a hydrogen atom or an alkyl group. The alkyl group includes any of linear shape, branched shape, or cyclic shape. The number of carbon atoms in the alkyl group is, for example, 1 to 10, preferably 1 to 6, and more preferably 1 to 3. Moreover, the alkyl group may further have a substituent (for example, the substituent group Y). Among them, —NHR$^T$ is preferably —NH$_2$.

The surface modifier B may have one kind of the functional groups B alone or two or more kinds thereof.

The number of functional groups B in the surface modifier B is preferably 1 to 5, and more preferably 1 to 2.

In addition, the surface modifier B preferably does not have the aforementioned functional group A.

General Formula (Ba):

The surface modifier B is preferably a compound represented by General Formula (Ba).

$$[P^a-L^{Pa}-]_{ma}Q^a[-L^{Ra}-R^{Ba}]_{na} \qquad (Ba)$$

ma, na, P$^a$, L$^{Pa}$, and L$^{Ra}$ in General Formula (Ba) are the same as ma, na, P$^a$, L$^{Pa}$, and L$^{Ra}$ in General Formula (Aa).

However, in General Formula (Ba), a substituent that the divalent linking group in L$^{Pa}$ and L$^{Ra}$ may further have, if possible, preferably does not include a functional group A.

In General Formula (Ba), R$^{Ba}$ represents a functional group B (hydroxyl group, —NHR$^T$, carboxyl group, thiol group, or phosphate group).

The functional group B is as described above.

In General Formula (Ba), in a case where there are a plurality of R$^{Ba}$'s, the plurality of R$^{Ba}$'s may be the same as or different from each other.

General Formula (Bb)

The surface modifier B is preferably a compound represented by General Formula (Bb).

$$Y^b-[-(L^b)_{mb}-Z^{Bb}]_{nb} \qquad (Bb)$$

mb, nb, Y$^b$ and L$^b$ in General Formula (Bb) are the same as mb, nb, Y$^b$ and L$^b$ in General Formula (Ab), respectively.

In General Formula (Bb), Z$^{Bb}$ represents "an aromatic ring group that has a substituent R$^b$ containing one or both of adsorbent group (alkoxysilyl group, aldehyde group, and/or boronic acid group) and functional group B (hydroxyl group, —NHR$^T$, carboxyl group, thiol group, and/or phosphate group)".

The aromatic ring group may or may not have a substituent other than the substituent R$^b$.

As the aromatic ring group, the aromatic ring group described in General Formula (Aa) can be similarly applied, and among them, a benzene ring group or a naphthalene ring group is preferable.

The substituent R$^b$ may be a substituent R$^{b1}$ containing an adsorbent group, and not containing a functional group B. The substituent R$^{b1}$ may be a group partially containing an adsorbent group, or may be an adsorbent group itself.

The substituent R$^b$ may be a substituent R$^{b2}$ containing the functional group B and not containing the adsorbent group. The substituent R$^{b2}$ may be a group partially containing the functional group B, or may be the functional group B itself.

The substituent R$^b$ may be a substituent R$^{b3}$ containing both of an adsorbent group and a functional group B.

The aromatic ring group in Z$^{Bb}$ may have only one kind of the substituent R$^{b1}$, the substituent R$^{b2}$, or the substituent R$^{b3}$, or may have two or more kinds thereof.

However, General Formula (Bb) satisfies "at least one or both requirements of the substituent R$^{b1}$ or the substituent R$^{b2}$ is present (Requirement b1)" and "at least one substituent R$^{b3}$ is present (Requirement b2)" with respect to substituents R$^b$ present in a plurality of numbers.

Among them, in General Formula (Bb), there are preferably both of "Z$^{Bb}$ which is an aromatic ring group having only a substituent $R^{b1}$ among the substituent $R^{b1}$, the substituent $R^{b2}$, and the substituent $R^{b3}$" and "$Z^{Bb}$" which is an aromatic ring group having only a substituent $R^{b2}$ among the substituent $R^{b1}$, the substituent $R^{b2}$, and the substituent $R^{b3}$".

The substituent $R^b$ (substituent containing one or both of the adsorbent group and the functional group B) is preferably a group represented by General Formula (RBb).

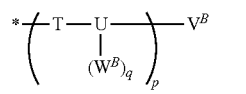
(RBb)

*, T, U, p, and q in General Formula (RBb) are the same as *, T, U, p, and q in General Formula (RAb), respectively.

However, U in General Formula (RBb) is bonded to T, $V^B$, and $W^B$ via a ring member atom of the aromatic ring group or the cycloalkane ring group.

In General Formula (RBb), $V^B$ and a plurality of $W^B$'s each independently represent an adsorbent group-containing group or a functional group B-containing group, respectively.

The adsorbent group-containing group is the same as the adsorbent group-containing group described in the description regarding General Formula (RAb).

The functional group B-containing group means a functional group B (hydroxyl group, —$NHR^T$, carboxyl group, thiol group, or phosphate group) or a monovalent group having a functional group B. The monovalent group having a functional group B is preferably a group represented by "-$L^{eo}$-functional group B".

The $L^{eo}$ is the same as $L^{eo}$ described in the description of General Formula (RAb).

All groups of $V^B$ and a plurality of $W^B$'s in General Formula (RBb) may be adsorbent group-containing groups, or all groups thereof may be functional group B-containing groups, and the adsorbent group-containing group and the functional group B-containing group may be mixed.

That is, the group represented by General Formula (RBb) may be a substituent $R^{b1}$ (a group including an adsorbent group and not including a functional group B), or may be a substituent $R^{b2}$ (a group including a functional group B, and not including an adsorbent group), or may be a substituent $R^{B3}$ (a group including both of an adsorbent group and a functional group B).

In General Formula (Bb), in a case where there are a plurality of groups represented by General Formula (RBb), a plurality of groups represented by General Formula (RBb) may be the same as or different from each other.

In addition, in a case where there are a plurality of $V^B$'s and/or $W^B$'s in General Formula (RBb), the plurality of $V^B$'s and/or $W^B$'s may be the same as or different from each other.

In General Formula (Bb), in a case where there is a plurality of $Z^{Bb}$'s, the plurality of $Z^{Bb}$'s may be the same as or different from each other.

General Formula (Bb2)

Among them, the compound represented by General Formula (Bb) is preferably a compound represented by General Formula (Bb2).

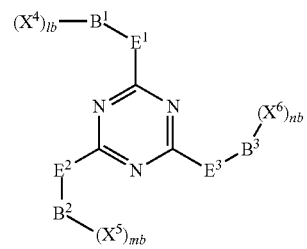
(Bb2)

$E^1$ to $E^3$, $B^1$ to $B^3$, lb, mb, and nb in General Formula (Bb2) are the same as $E^1$ to $E^3$, $B^1$ to $B^3$, lb, mb, and nb in General Formula (Ab2), respectively.

In General Formula (Bb2), in a case where lb is 2 or greater (that is, in a case where there are a plurality of $X^4$'s), $X^4$'s present in a plurality of numbers (lb pieces) may be the same as or different from each other. In a case where mb is 2 or greater (that is, in a case where there are a plurality of $X^5$'s), $X^5$'s present in a plurality of numbers (mb pieces) may be the same as or different from each other. In a case where nb is 2 or greater (that is, in a case where there are a plurality of $X^6$'s), $X^6$'s present in a plurality of numbers (nb pieces) may be the same as or different from each other.

In General Formula (Bb2), $X^4$ to $X^6$ each independently represent a group represented by General Formula (RBb).

That is, in General Formula (Bb2), there are a total of "lb+mb+nb" pieces of groups represented by General Formula (RBb). "lb+mb+nb" is 1 or greater (preferably 2 to 10, more preferably 3 to 6).

General Formula (Bb2) satisfies one or both requirements of "there is at least one of a group represented by General Formula (RBb) which is a substituent $R^{b1}$ or a group represented by General Formula (RBb) which is a substituent $R^{b2}$ (Requirement b3)" and "there is at least one of a group represented by General Formula (RBb) which is a substituent $R^{b3}$ (Requirement b4)" with respect to the group represented by General Formula (RBb) present in "lb+mb+nb" pieces.

Among them, in General Formula (Bb2), "$X^4$ is a group represented by General Formula (RBb) which is the substituent $R^{b1}$, and $X^6$ is a group represented by General Formula (RBb) which is the substituent $R^{b2}$" is preferable, and "X4 is a group represented by General Formula (RBb) which is the substituent $R^{b1}$, and $X^5$ and $X^6$ are groups represented by General Formula (RBb) which are the substituents $R^{b2}$" is more preferable.

General Formula (Bb3), General Formula (Bb4)

Among them, the compound represented by General Formula (Bb) is more preferably a compound represented by General Formula (Bb3) or a compound represented by General Formula (Bb4).

(Bb3)

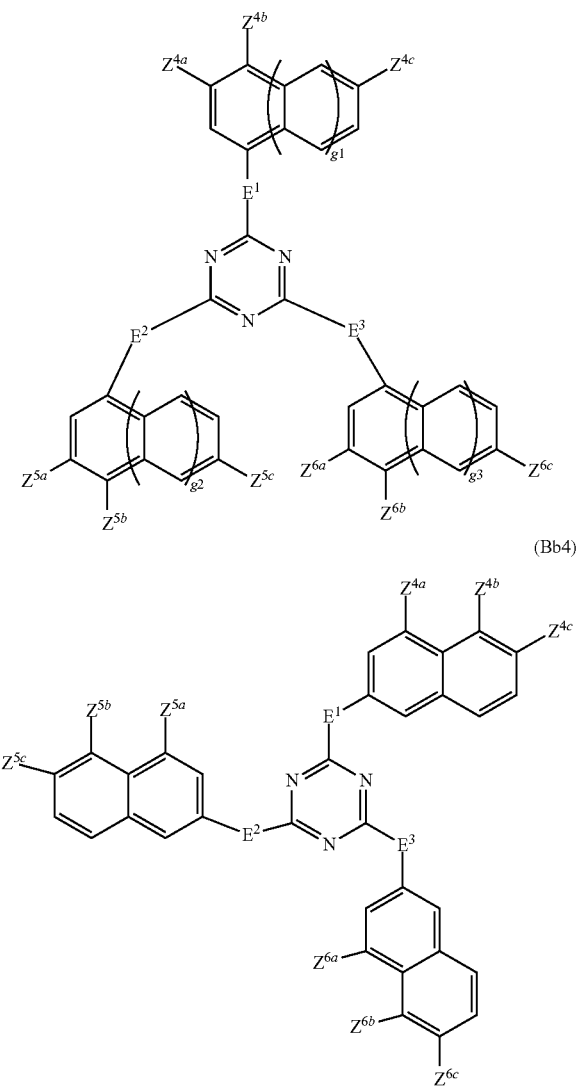

(Bb4)

$E^1$ to $E^3$ and $g^1$ to $g^3$ in General Formula (Bb3) and General Formula (Bb4) are the same as $E^1$ to $E^3$ and $g^1$ to $g^3$ in General Formula (Bb3), respectively.

In General Formula (Bb3), $Z^{4a}$ to $Z^{4c}$, $Z^{5a}$ to $Z^{5c}$, and $Z^{6a}$ to $Z^{6c}$ each independently represent a hydrogen atom or a group represented by General Formula (RBb).

Here, a total of two or more (preferably 2 to 9, and more preferably 3 to 6) among $Z^{4a}$ to $Z^{4c}$, $Z^{5a}$ to $Z^{5c}$, and $Z^{6a}$ to $Z^{6c}$ are the groups represented by General Formula (RBb).

The groups represented by General Formula (RBb) are as described above.

At least one (preferably 1 or 2) of $Z^{4a}$, $Z^{4b}$, or $Z^{4c}$ is preferably a group represented by General Formula (RBb), at least one (preferably 1 to 2) of $Z^{5a}$, $Z^{5b}$, or $Z^{5c}$ is preferably a group represented by General Formula (RBb), and at least one of $Z^{6a}$, $Z^{6b}$, or $Z^{6c}$ (preferably 1 to 2) is preferably a group represented by General Formula (RBb).

In addition, General Formula (Bb3) and General Formula (Bb4) satisfy "there is at least one of a group represented by General Formula (RBb) which is the substituent $R^{b1}$ or a group represented by General Formula (RAb) which is the substituent $R^{b2}$ (Requirement b5)" and "there is at least one of a group represented by General Formula (RBb) which is the substituent $R^{b3}$ (Requirement b6)" with respect to the group represented by General Formula (RBb) present in 2 to 9 pieces.

Among them, in General Formula (Bb3) and General Formula (Bb4), "$Z^{4a}$ to $Z^{4c}$ are each independently a group represented by General Formula (RBb) which is a hydrogen atom or a substituent $R^{b1}$, and $Z^{6a}$ to $Z^{6c}$ are each independently a group represented by General Formula (RBb) which is a hydrogen atom or a substituent $R^{b2}$" is preferable, and "$Z^{4a}$ to $Z^{4c}$ are each independent a group represented by General Formula (RBb) which is a hydrogen atom or a substituent $R^{b1}$, and $Z^{5a}$ to $Z^{5c}$ and $Z^{6a}$ to $Z^{6c}$ are each independently a group represented by General Formula (RBb) which is a hydrogen atom or a substituent $R^{b2}$" is more preferable.

One kind of the surface modifiers B may be used singly, or two or more kinds thereof may be used.

<Method for Producing Surface-Modified Inorganic Substance>

A method for producing a surface-modified inorganic substance (surface-modified inorganic substance X, surface-modified inorganic substance A, or surface-modified inorganic substance B) is not particularly limited, and examples thereof include a method including a step of bringing an inorganic substance and a surface modifier (surface modifier A and/or surface modifier B) into contact with each other.

The contact between the inorganic substance and the surface modifier A and/or the surface modifier B is carried out, for example, by stirring a solution containing the inorganic substance and the surface modifier.

The kind of solvent in the above solution is not particularly limited, but an organic solvent is preferable. Examples of the organic solvent include cyclopentanone, ethyl acetate, methyl ethyl ketone, dichloromethane, and tetrahydrofuran.

The solution may contain other components such as a thermosetting compound described below. For example, the inorganic substance and the surface modifier may be brought into contact with each other in a solution containing a part or all of another raw material in the composition of the present invention. In this case, forming the surface-modified inorganic substance in the solution and preparing the composition according to the embodiment of the present invention may be carried out by the same procedure.

In a case where the inorganic substance and the surface modifier are brought into contact with each other in a solution containing a part or all of another raw material in the composition according to the embodiment of the present invention to form a surface-modified inorganic substance, an addition amount of the surface modifier A and the surface modifier B with respect to the solution is each independently preferably 0.001% to 10% by mass, more preferably 0.01 to 5% by mass, and even more preferably 0.01% to 1% by mass, with respect to a total solid content of the composition.

In addition, the surface-modified inorganic substance may be separately prepared and then the prepared surface-modified inorganic substance may be mixed with a part or all of another raw material in the composition according to the embodiment of the present invention.

A mixing ratio of the inorganic substance and the surface modifier (surface modifier A and/or surface modifier B) should be determined in consideration of the structure and surface area of the inorganic substance and the molecular structure such as aspect ratio of a molecule of the surface modifier.

Stirring conditions (stirring rotation speed, temperature conditions) are not particularly limited.

<Surface-Modified Inorganic Substance>

In the surface-modified inorganic substance, the surface modifier (surface modifier A and/or surface modifier B) performs surface modification of the inorganic substance. The surface modifier preferably forms a bond with the inorganic substance to achieve surface modification.

The shape of surface-modified inorganic nitride is not particularly limited, and may be in the form of particles, a film, or a plate.

A mass ratio of the surface modifier (surface modifier A and surface modifier B) to the inorganic substance in the surface-modified inorganic substance (total mass of surface modifier A and surface modifier B adsorbed on the surface of the inorganic substance/mass of the inorganic substance) is not particularly limited, but the mass ratio is preferably 0.00001 to 0.5, and more preferably 0.0001 to 0.1, from the viewpoint that the dispersibility of the surface-modified inorganic substance is superior.

In the surface-modified inorganic substance, the surface modifier (surface modifier A and/or surface modifier B) may be adsorbed on the surface of the inorganic substance, and other compounds may be adsorbed on the surface of the inorganic substance. That is, the surface-modified inorganic substance may include an inorganic substance, a surface modifier (surface modifier A and a surface modifier B) adsorbed on the surface of the inorganic substance, and other compounds.

(Surface-Modified Inorganic Substance X)

The surface-modified inorganic substance X contains an inorganic substance, and a surface modifier A and a surface modifier B adsorbed on the surface of the inorganic substance.

That is, in the surface-modified inorganic substance X, both of the surface modifier A and the surface modifier B are adsorbed on the surface of the inorganic substance. In addition, as described above, other compounds may be adsorbed on the surface of the inorganic substance.

In the surface-modified inorganic substance X, a mass ratio of the surface modifier A to the surface modifier B (mass of the surface modifier A/mass of the surface modifier B) adsorbed on the surface of the inorganic substance is preferably 1/99 to 99/1, and more preferably 20/80 to 80/20.

One kind of the surface-modified inorganic substances X may be used singly, or two or more kinds thereof may be used.

(Surface-Modified Inorganic Substance A)

The surface-modified inorganic substance A contains the inorganic substance and the surface modifier A adsorbed on the surface of the inorganic substance, and does not contain the surface modifier B. In addition, as described above, other compounds may be adsorbed on the surface of the inorganic substance.

The fact that the surface-modified inorganic substance A does not contain the surface modifier B means that in the surface-modified inorganic substance A, the surface modifier B is not substantially adsorbed on the surface of the inorganic substance.

The fact that the surface modifier B is not substantially adsorbed on the surface of the inorganic substance means that the surface modifier B is not adsorbed on the surface of the inorganic substance at all, or that a mass ratio of the surface modifier A and the surface modifier B (mass of the surface modifier A/mass of the surface modifier B), adsorbed on the surface of the inorganic substance, is more than 99/1.

One kind of the surface-modified inorganic substances A may be used singly, or two or more kinds thereof may be used.

(Surface-Modified Inorganic Substance B)

The surface-modified inorganic substance B contains the inorganic substance and the surface modifier B adsorbed on the surface of the inorganic substance, and does not contain the surface modifier A. In addition, as described above, other compounds may be adsorbed on the surface of the inorganic substance.

The fact that the surface-modified inorganic substance B does not contain the surface modifier A means that the surface-modified inorganic substance B does not substantially adsorb the surface modifier A on the surface of the inorganic substance.

The fact that the surface modifier A is not substantially adsorbed on the surface of the inorganic substance means that the surface modifier A is not adsorbed on the surface of the inorganic substance at all, or that a mass ratio of the surface modifier A to the surface modifier B (mass of the surface modifier A/mass of the surface modifier B), adsorbed on the surface of the inorganic substance, is less than 1/99.

One kind of the surface-modified inorganic substances B may be used singly, or two or more kinds thereof may be used.

The surface-modified inorganic substance contained in the composition according to the embodiment of the present invention satisfies at least one of including the surface-modified inorganic substance X (Requirement 1) or including the surface-modified inorganic substance A and the surface-modified inorganic substance B (Requirement 2), may satisfy only Requirement 1, may satisfy only Requirement 2, and may satisfy both of Requirement 1 and Requirement 2.

In a case where the composition according to the embodiment of the present invention contains two or more kinds of the surface-modified inorganic substance X, the surface-modified inorganic substance A, and/or the surface-modified inorganic substance B (for example, in a case of containing the surface-modified inorganic substance A and the surface-modified inorganic substance B), the inorganic substance in the two or more kinds of the surface-modified inorganic substances may be the same as or different from each other.

In addition, a content of the surface-modified inorganic substance X in the composition according to the embodiment of the present invention may be 10% to 100% by mass, may be 50% to 100%, or may be 90% to 100%, with respect to a total mass of the surface-modified inorganic substance. In this case, the surface-modified inorganic substance other than the surface-modified inorganic substance X may be the surface-modified inorganic substance A alone, may be the surface-modified inorganic substance B alone, or may be both of the surface-modified inorganic substance A and the surface-modified inorganic substance B.

In addition, in a case where the composition according to the embodiment of the present invention contains the surface-modified inorganic substance A and the surface-modified inorganic substance B, a total content of the surface-modified inorganic substance A and the surface-modified inorganic substance B in the composition according to the embodiment of the present invention may be 10% to 100% by mass, may be 50% to 100%, or may be 90% to 100%, with respect to the total mass of the surface-modified inorganic substance. In this case, the surface-modified inorganic substance other than the surface-modified inorsubstance A and the surface-modified inorganic substance B is the surface-modified inorganic substance X.

In a case where the composition according to the embodiment of the present invention contains the surface-modified inorganic substance A and the surface-modified inorganic substance B, a mass ratio of the surface-modified inorganic substance A to the surface-modified inorganic substance B (mass of the surface-modified inorganic substance A/mass of the surface-modified inorganic substance B) is preferably 1/99 to 99/1, more preferably 20/80 to 80/20, and even more preferably 35/65 to 65/35.

A content of the surface-modified inorganic substance in the composition is preferably 40% to 95% by mass, more preferably 50% to 95% by mass, and even more preferably 60% to 95% by mass, with respect to the total solid content of the composition.

The composition according to the embodiment of the present invention may contain a material that does not correspond to the aforementioned surface-modified inorganic substances (surface-modified inorganic substance X, surface-modified inorganic substance A, and/or surface-modified inorganic substance B), the material containing an inorganic substance and a compound not containing any one of the surface modifier A or the surface modifier B, adsorbed on the surface of the inorganic substance.

[Thermosetting Compound]

The composition according to the embodiment of the present invention contains a thermosetting compound.

Examples of the thermosetting compound include an epoxy compound, an oxetane compound, a melamine compound, a urea compound, and a phenolic compound.

However, the thermosetting compound is other than the aforementioned surface-modified inorganic substances (surface-modified inorganic substance X, surface-modified inorganic substance A, and surface-modified inorganic substance B) and surface modifiers (surface modifier A and surface modifier B).

The thermosetting compound preferably includes an epoxy compound.

<Epoxy Compound>

The epoxy compound is a compound having at least one epoxy group (oxiranyl group) in one molecule. The epoxy group may or may not have a substituent, if possible.

The number of epoxy groups contained in the epoxy compound is preferably 2 or greater, more preferably 2 to 40, even more preferably 2 to 10, and particularly preferably 2, in one molecule.

A molecular weight of the epoxy compound is preferably 150 to 10,000, more preferably 150 to 2,000, and even more preferably 250 to 400.

A lower limit value of the epoxy group content of the epoxy compound is preferably 2.0 mmol/g or greater, more preferably 4.0 mmol/g or greater, and even more preferably 5.0 mmol/g or greater. An upper limit value thereof is preferably 20.0 mmol/g or less, more preferably 15.0 mmol/g or less, and even more preferably 10.0 mmol/g or less.

The epoxy group content means the number of epoxy groups contained in 1 g of the epoxy compound.

The epoxy compound may or may not exhibit liquid crystallinity.

That is, the epoxy compound may be a liquid crystal compound. In other words, a liquid crystal compound having an epoxy group can also be used as the epoxy compound.

Examples of the epoxy compound (which may be a liquid crystalline epoxy compound) include a compound (rod-like compound) which has a rod-like structure in at least a portion thereof, and a compound (disk-like compound) which has a disk-like structure in at least a portion thereof.

Among them, a rod-like compound is preferable from the viewpoint that the thermally conductive properties of the obtained thermally conductive material are superior.

Hereinafter, the rod-like compound and the disk-like compound will be described in detail.

(Rod-Like Compound)

Examples of the epoxy compounds, which are rod-like compounds, include azomethines, azoxies, cyanobiphenyls, cyanophenyl esters, benzoic acid esters, cyclohexane carboxylic acid phenyl esters, cyanophenyl cyclohexanes, cyano-substituted phenylpyrimidines, alkoxy-substituted phenylpyrimidines, phenyldioxanes, tolans, and alkenylcyclohexyl benzonitriles. In addition to these low-molecular-weight compounds described above, high-molecular-weight compounds can also be used. The aforementioned high-molecular-weight compounds are high-molecular-weight compounds obtained by polymerizing rod-like compounds having a low-molecular-weight reactive group.

Examples of a preferred rod-like compound include a rod-like compound represented by General Formula (E1).

Among them, the rod-like compound is preferably a compound represented by General Formula (E1).

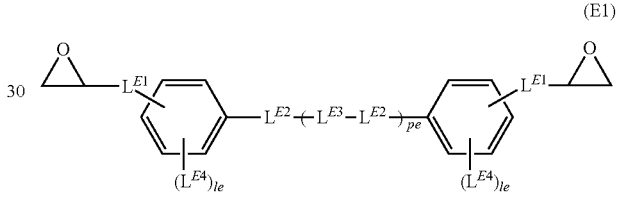

(E1)

In General Formula (E1), $L^{E1}$'s each independently represent a single bond or a divalent linking group.

Among them, $L^{E1}$ is preferably a divalent linking group.

The divalent linking group is preferably —O—, —S—, —CO—, —NH—, —CH=CH—, —C≡C—, —CH=N—, —N=CH—, —N=N—, an alkylene group which may have a substituent, or a group obtained by combining two or more thereof, and more preferably —O-alkylene group- or -alkylene group-O—.

Moreover, the alkylene group may be any one of linear, branched, or cyclic, but is preferably a linear alkylene group having 1 or 2 carbon atoms.

The plurality of $L^{E1}$'s may be the same as or different from each other.

In General Formula (E1), $L^{E2}$'s each independently represent a single bond, —CH=CH—, —CO—O—, —O—CO—, —C(—CH$_3$)=CH—, —CH=C(—CH$_3$)—, —CH=N—, —N=CH—, —N=N—, —C≡C—, —N=N$^+$(—O$^-$)—, —N$^+$(—O$^-$)=N—, —CH=N$^+$(—O$^-$)—, —N$^+$(—O$^-$)=CH—, —CH=CH—CO—, —CO—CH=CH—, —CH=C(—CN)—, or —C(—CN)=CH—.

Among them, $L^{E2}$'s are each independently preferably a single bond, —CO—O—, or —O—CO—.

In a case where there are a plurality of $L^{E2}$'s, the plurality of $L^{E2}$'s may be the same as or different from each other.

In General Formula (E1), LE3's each independently represent a single bond, a 5-membered or 6-membered aromatic ring group or a 5-membered or 6-membered non-aromatic ring group, which may have a substituent, or a polycyclic group consisting of these rings.

Examples of the aromatic ring group and non-aromatic ring group represented by $L^{E3}$ include a 1,4-cyclohexanediyl group, a 1,4-cyclohexenediyl group, a 1,4-phenylene group, a pyrimidine-2,5-diyl group, a pyridine-2,5-diyl group, a 1,3,4-thiadiazole-2,5-diyl group, a 1,3,4-oxadiazole-2,5-diyl group, a naphthalene-2,6-diyl group, a naphthalene-1,5-diyl group, a thiophene-2,5-diyl group, and a pyridazine-3,6-diyl group, each of which may have a substituent. In a case of the 1,4-cyclohexanediyl group, the group may be any one isomer of structural isomers of a trans-isomer and a cis-isomer, or a mixture in which the isomers are mixed at any ratio. Among them, a trans-isomer is preferable.

Among them, $L^{E3}$ is preferably a single bond, a 1,4-phenylene group, or a 1,4-cyclohexenediyl group.

The substituents contained in the groups represented by $L^{E3}$ are each independently preferably an alkyl group, an alkoxy group, a halogen atom, a cyano group, a nitro group, or an acetyl group, and more preferably an alkyl group (preferably having one carbon atom).

In a case where there are a plurality of substituents, these substituents may be the same as or different from each other.

In a case where there are a plurality of $L^{E3}$'s, the plurality of $L^{E3}$'s may be the same as or different from each other.

In General Formula (E1), pe represents an integer of 0 or greater.

In a case where pe is an integer of 2 or greater, a plurality of $(-L^{E3}-L^{E2}-)$'s may be the same as or different from each other.

Among them, pe is preferably 0 to 2, more preferably 0 or 1, and even more preferably 0.

In General Formula (E1), $L^{E4}$'s each independently represent a substituent.

The substituents are each independently preferably an alkyl group, an alkoxy group, a halogen atom, a cyano group, a nitro group, or an acetyl group, and more preferably an alkyl group (preferably having one carbon atom).

A plurality of $L^{E4}$'s may be the same as or different from each other. In addition, in a case where le described below is an integer of 2 or greater, the plurality of $L^{E4}$'s present in the same $(L^{E4})_{ie}$ may also be the same as or different from each other.

In General Formula (E1), le's each independently represent an integer of 0 to 4.

Among them, le's are each independently preferably 0 to 2.

A plurality of le's may be the same as or different from each other.

The rod-like compound preferably has a biphenyl skeleton.

(Disk-Like Compound)

The epoxy compound, which is a disk-like compound, has a disk-like structure in at least a portion thereof.

The disk-like structure has at least an alicyclic ring or an aromatic ring. In particular, in a case where the disk-like structure has an aromatic ring, the disk-like compound can form a columnar structure by forming a stacking structure based on the intermolecular π-π interaction.

Examples of the disk-like structure include the triphenylene structure described in Angew. Chem. Int. Ed. 2012, 51, 7990 to 7993, or JP1995-306317A (JP-H07-306317A), and the trisubstituted benzene structures described in JP2007-2220A and JP2010-244038A.

The disk-like compound preferably has three or more epoxy groups. The cured substance of the epoxy compound, which includes the disk-like compound having three or more epoxy groups, tends to have a high glass transition temperature and high heat resistance.

The number of epoxy groups contained in the disk-like compound is preferably 8 or less and more preferably 6 or less.

Examples of the disk-like compound include compounds which have at least one (preferably, three or more) of terminals as an epoxy group in the compounds or the like described in C. Destrade et al., Mol. Crysr. Liq. Cryst., vol. 71, page 111 (1981); edited by The Chemical Society of Japan, Quarterly Review of Chemistry, No. 22, Chemistry of liquid crystal, Chapter 5, Chapter 10, Section 2 (1994); B. Kohne et al., Angew. Chem. Soc. Chem. Comm., page 1794 (1985); J. Zhang et al., J. Am. Chem. Soc., vol. 116, page 2655 (1994); and JP4592225B.

Examples of the disk-like compound include compounds which have at least one (preferably, three or more) of terminals as an epoxy group in the triphenylene structure described in Angew. Chem. Int. Ed. 2012, 51, 7990 to 7993 and JP1995-306317A (JP-H07-306317A) and the trisubstituted benzene structures described in JP2007-2220A and JP2010-244038A.

Examples of other epoxy compounds other than the aforementioned epoxy compound include an epoxy compound represented by General Formula (DN).

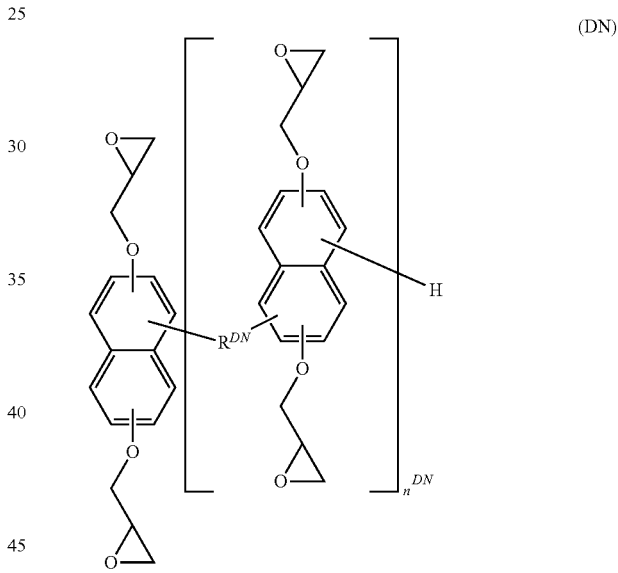

(DN)

In General Formula (DN), $n^{DN}$ represents an integer of 0 or greater, and is preferably 0 to 5 and more preferably 1.

$R^{DN}$ represents a single bond or a divalent linking group. The divalent linking group is preferably —O—, —O—CO—, —CO—O—, —S—, an alkylene group (the number of carbon atoms is preferably 1 to 10), an arylene group (the number of carbon atoms is preferably 6 to 20), or a group obtained by combining these groups, more preferably an alkylene group, and even more preferably a methylene group.

Further, in the epoxy compound, in General Formula (Ab) described for the surface modifier A, $Z^{Ab}$ may be a compound representing "an aromatic ring group not having a phenolic hydroxyl group and an adsorbent group, and having a substituent containing an epoxy group". The substituents (substituents containing an epoxy group) contained in the aromatic ring group are preferably groups in which all groups of $V^A$ and a plurality of $W^A$ are epoxy groups or monovalent groups having an epoxy group in General Formula (RAb).

In addition, in the epoxy compound, in General Formula (Ab2), $X^1$ to $X^3$ may be each independently a compound representing "a group in which all groups of $V^A$ and a plurality of $W^A$ are epoxy groups or monovalent groups having an epoxy group in General Formula (RAb)".

Examples of the other epoxy compounds include, in addition to the aforementioned epoxy compounds, a bisphenol A-type epoxy compound (compound in which in General Formula (E1), "pe is 0" and "$L^{E2}$ is —C(CH$_3$)$_2$—", or the like), a bisphenol F-type epoxy compound, a bisphenol S-type epoxy compound, a bisphenol AD-type epoxy compound, and the like, which are glycidyl ethers of bisphenol A, F, S, and AD, and the like; a hydrogenated bisphenol A-type epoxy compound, a hydrogenated bisphenol AD-type epoxy compound, and the like; a phenol novolac-type glycidyl ether (phenol novolac-type epoxy compound), a cresol novolac-type glycidyl ether (cresol novolac-type epoxy compound), a bisphenol A novolac-type glycidyl ether, and the like; a dicyclopentadiene-type glycidyl ether (dicyclopentadiene-type epoxy compound); a dihydroxypentadiene-type glycidyl ether (dihydroxypentadiene-type epoxy compound); a polyhydroxybenzene-type glycidyl ether (polyhydroxybenzene-type epoxy compound); a benzene polycarboxylic acid-type glycidyl ester (benzene polycarboxylic acid-type epoxy compound); an alicyclic epoxy compound such as 3,4:8,9-diepoxybicyclo[4.3.0]nonane, and a trisphenol methane-type epoxy compound.

One kind of the epoxy compounds may be used singly, or two or more kinds thereof may be used.

In a case where the composition according to the embodiment of the present invention contains the epoxy compound, the content of the epoxy compound is preferably 1.0% to 25.0% by mass, more preferably 3.0% to 20.0% by mass, and even more preferably 10.0% to 20.0% by mass, with respect to the total solid content of the composition.

<Phenolic Compound>

The thermosetting compound in the composition according to the embodiment of the present invention preferably further contains a phenolic compound.

The phenolic compound is a compound having one or more (preferably two or more and more preferably three or more) phenolic hydroxyl groups.

From the viewpoint that the effect of the present invention is superior, examples of the phenolic compound include a compound represented by General Formula (P1).

<Compound Represented by General Formula (P1)>

General Formula (P1) will be shown below.

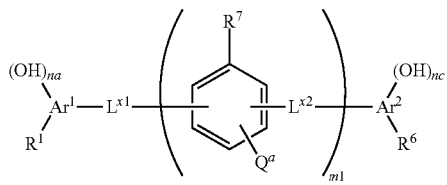

(P1)

In General Formula (P1), ml represents an integer of 0 or greater.

ml is preferably 0 to 10, more preferably 0 to 3, even more preferably 0 or 1, and particularly preferably 1.

In General Formula (P1), na and nc each independently represent an integer of 1 or greater.

na and nc are each independently preferably 1 to 4.

In General Formula (P1), $R^1$ and $R^6$ each independently represent a hydrogen atom, a halogen atom, a carboxylic acid group, a boronic acid group, an aldehyde group, an alkyl group, an alkoxy group, or an alkoxycarbonyl group.

The alkyl group may be linear or branched. The number of carbon atoms in the alkyl group is preferably 1 to 10. The alkyl group may or may not have a substituent.

An alkyl group moiety in the alkoxy group and an alkyl group moiety in the alkoxycarbonyl group are the same as the aforementioned alkyl group.

$R^1$ and $R^6$ are each independently preferably a hydrogen atom or a halogen atom, more preferably a hydrogen atom or a chlorine atom, and even more preferably a hydrogen atom.

In General Formula (P1), $R^7$ represents a hydrogen atom or a hydroxyl group.

In a case where there are a plurality of $R^7$'s, $R^7$'s present in the plurality of numbers may be the same as or different from each other.

In a case where there are the plurality of $R^7$'s, it is also preferable that at least one $R^7$ among the plurality of $R^7$'s represents a hydroxyl group.

In General Formula (P1), $L^{x1}$ represents a single bond, —C(R$^2$)(R$^3$)—, or —CO—, and is preferably —C(R$^2$)(R$^3$)— or —CO—.

$L^{x2}$ represents a single bond, —C(R$^4$)(R$^5$)—, or —CO—, and is preferably —C(R$^4$)(R$^5$)— or —CO—.

$R^2$ to $R^5$ each independently represent a hydrogen atom or a substituent.

The substituents are each independently preferably a hydroxyl group, a phenyl group, a halogen atom, a carboxylic acid group, a boronic acid group, an aldehyde group, an alkyl group, an alkoxy group, or an alkoxycarbonyl group, and more preferably a hydroxyl group, a halogen atom, a carboxylic acid group, a boronic acid group, an aldehyde group, an alkyl group, an alkoxy group, or an alkoxycarbonyl group.

The alkyl group may be linear or branched. The number of carbon atoms in the alkyl group is preferably 1 to 10. The alkyl group may or may not have a substituent.

An alkyl group moiety in the alkoxy group and an alkyl group moiety in the alkoxycarbonyl group are the same as the aforementioned alkyl group.

The phenyl group may or may not have a substituent, and in a case where the phenyl group has a substituent, it is more preferable to have one to three hydroxyl groups.

$R^2$ to $R^5$ are each independently preferably a hydrogen atom or a hydroxyl group and more preferably a hydrogen atom.

$L^{x1}$ and $L^{x2}$ are each independently preferably —CH$_2$—, —CH(OH)—, —CO—, or —CH(Ph)—.

Ph represents a phenyl group which may have a substituent.

Furthermore, in General Formula (P1), in a case where there are a plurality of $R^4$'s, the plurality of $R^4$'s may be the same as or different from each other. In a case where there are a plurality of $R^5$'s, the plurality of $R^5$'s may be the same as or different from each other.

In General Formula (P1), $Ar^1$ and $Ar^2$ each independently represent a benzene ring group or a naphthalene ring group.

$Ar^1$ and $Ar^2$ are each independently preferably a benzene ring group.

In General Formula (P1), $Q^a$ represents a hydrogen atom, an alkyl group, a phenyl group, a halogen atom, a carboxylic acid group, a boronic acid group, an aldehyde group, an alkoxy group, or an alkoxycarbonyl group.

The alkyl group may be linear or branched. The number of carbon atoms in the alkyl group is preferably 1 to 10. The alkyl group may or may not have a substituent.

An alkyl group moiety in the alkoxy group and an alkyl group moiety in the alkoxycarbonyl group are the same as the aforementioned alkyl group.

The phenyl group may or may not have a substituent.

$Q^a$ is preferably bonded to a para position with respect to a hydroxyl group that a benzene ring group, to which $Q^a$ is bonded, may have.

$Q^a$ is preferably a hydrogen atom or an alkyl group. The alkyl group is preferably a methyl group.

Furthermore, in General Formula (P1), in a case where there are a plurality of $R^7$'s, $L^{x2}$'s and/or $Q^a$'s, the plurality of $R^7$'s, $L^{x2}$'s, and/or $Q^a$'s may be the same as or different from each other.

Further, as for the phenolic compound, in the compound represented by General Formula (Bb) described for the surface modifier B, $Z^{Bb}$ may be a compound representing "an aromatic ring group not having an epoxy group and an adsorbent group, and having a substituent containing a hydroxyl group (preferably a phenolic hydroxyl group)". Such a phenolic compound does not satisfy the aforementioned Requirements b1 and b2. The substituent (substituent containing a hydroxyl group (preferably a phenolic hydroxyl group)) contained in the aromatic ring group is a group represented by General Formula (RBb) in which U is an aromatic ring group which may have a substituent, and all of $V^B$ and the plurality of $W^B$ are preferably hydroxyl groups.

Further, in the phenolic compound, in the compound represented by General Formula (Bb2), $X^4$ to $X^6$ may be a compound representing "a group in which all of $V^B$ and a plurality of $W^B$ are hydroxyl groups in General Formula (RBb)", and $X^4$ to $X^6$ may be a compound representing "a group in which U is an aromatic ring group which may have a substituent, and all of $V^B$ and the plurality of $W^B$ are hydroxyl groups in General Formula (RBb)". Such a phenolic compound does not satisfy the aforementioned Requirements b3 and b4. Other than these conditions, the preferable conditions in the compound represented by General Formula (Bb2) are also valid for the aforementioned phenolic compound.

In addition, the phenolic compound is a compound represented by General Formula (Bb3) and/or a compound represented by General Formula (Bb4), may be a compound in which 2 to 9 pieces of $Z^{4a}$ to $Z^{4c}$, $Z^{5a}$ to $Z^{5c}$, and $Z^{6a}$ to $Z^{6c}$ are "groups in which all of $V^B$ and a plurality of $W^B$ in General Formula (RBb) are hydroxyl groups", the rest is a hydrogen atom, or may be a compound in which 2 to 9 pieces of $Z^{4a}$ to $Z^{4c}$, $Z^{5a}$ to $Z^{5c}$, and $Z^{6a}$ to $Z^{6c}$ are "groups in which U is an aromatic group which may have a substituent, and all of $V^B$ and a plurality of $W^B$ in General Formula (RBb) are hydroxyl groups", and the rest is a hydrogen atom. The aforementioned phenolic compound does not satisfy the aforementioned Requirements b5 and b6. Other than these conditions, the preferable conditions in the compound represented by General Formula (Bb3) and/or the compound represented by the general formula (Bb4) are also valid for the aforementioned phenolic compound.

In addition to the aforementioned phenolic compounds, as the phenolic compound, for example, benzene polyol such as benzenetriol, a biphenyl aralkyl-type phenolic resin, a phenol novolac resin, a cresol novolac resin, an aromatic hydrocarbon formaldehyde resin-modified phenolic resin, a dicyclopentadiene phenol addition-type resin, a phenol aralkyl resin, a polyhydric phenol novolac resin synthesized from a polyhydric hydroxy compound and formaldehyde, a naphthol aralkyl resin, a trimethylolmethane resin, a tetraphenylolethane resin, a naphthol novolac resin, a naphthol phenol co-condensed novolac resin, a naphthol cresol co-condensed novolac resin, a biphenyl-modified phenolic resin, a biphenyl-modified naphthol resin, an aminotriazine-modified phenolic resin, an alkoxy group-containing aromatic ring-modified novolac resin, or the like is also preferable.

The lower limit value of the hydroxyl group content of the phenolic compound is preferably 3.0 mmol/g or greater and more preferably 7.0 mmol/g or greater. The upper limit value thereof is preferably 25.0 mmol/g or less and more preferably 20.0 mmol/g or less.

Moreover, the hydroxyl group content means the number of hydroxyl groups (preferably, phenolic hydroxyl groups) contained in 1 g of the phenolic compound.

Furthermore, the phenolic compound may have an active hydrogen-containing group (carboxylic acid group or the like) capable of a polymerization reaction with an epoxy compound, in addition to the hydroxyl group. The lower limit value of the content (total content of hydrogen atoms in a hydroxyl group, a carboxylic acid group, and the like) of an active hydrogen in the phenolic compound is preferably 3.0 mmol/g or greater and more preferably 7.0 mmol/g or greater. The upper limit value thereof is preferably 25.0 mmol/g or less and more preferably 20.0 mmol/g or less.

Moreover, the content of the active hydrogen means the number of active hydrogen atoms contained in 1 g of the phenolic compound.

The upper limit value of the molecular weight of the phenolic compound is preferably 600 or less, more preferably 500 or less, even more preferably 450 or less, and particularly preferably 400 or less. The lower limit value thereof is preferably 110 or greater and more preferably 300 or greater.

One kind of the phenolic compounds may be used singly, or two or more kinds thereof may be used.

In a case where the composition according to the embodiment of the present invention contains the phenolic compound, the content of the phenolic compound is preferably 1.0% by mass or greater, more preferably 3.0% to 25.0% by mass, and even more preferably 5.0% to 20.0% by mass, with respect to the total solid content of the composition.

The composition according to the embodiment of the present invention may contain a compound (also referred to as "other active hydrogen-containing compound") having a group capable of reacting with an epoxy group as a compound other than the phenolic compound and the surface-modified inorganic substance (surface-modified inorganic substance X, surface-modified inorganic substance A, and/or surface-modified inorganic substance B).

In a case where the composition according to the embodiment of the present invention contains the phenolic compound and also contains other active hydrogen-containing compounds, a mass ratio (content of other active hydrogen-containing compounds/content of phenolic compound) of a content of the other active hydrogen-containing compounds to the content of the phenolic compound in the composition according to the embodiment of the present invention is preferably 0 to 1, more preferably 0 to 0.1, and even more preferably 0 to 0.05.

In the composition according to the embodiment of the present invention, a ratio (total number of phenolic hydroxyl groups contained in solid content/total number of the number of epoxy groups contained in the solid content) of the total number of phenolic hydroxyl groups contained in the solid content (for example, the total number of the number of phenolic hydroxyl groups contained in the phenolic compound, and the number of phenolic hydroxyl groups contained in the surface modifier) to the total number of the number of epoxy groups contained in the solid content (for example, the total number of the number of epoxies contained in the epoxy compound and the number of epoxy groups contained in the surface modifier) is preferably 0.50 to 2.00, more preferably 0.65 to 1.50, and even more preferably 0.80 to 1.20.

In the composition according to the embodiment of the present invention, a ratio (total number of active hydrogen atoms contained in solid content/total number of the number of epoxy groups contained in the solid content) of the total number of active hydrogen atoms (hydrogen atoms of the phenolic hydroxyl group, and the like) contained in the solid content to the total number of the number of epoxy groups contained in the solid content is preferably 0.50 to 2.00, more preferably 0.65 to 1.50, and even more preferably 0.80 to 1.20.

A content of the thermosetting compound in the composition is preferably 1% to 70% by mass, more preferably 5% to 50% by mass, and even more preferably 10% to 40% by mass, with respect to the total solid content of the composition.

In addition, in the thermosetting compound in the composition, the total content of the epoxy compound and the phenolic compound is preferably 30% to 100% by mass, more preferably 70 to 100% by mass, and even more preferably 90% to 100% by mass, with respect to the total mass of the thermosetting compound.

[Curing Accelerator]

The composition may further contain a curing accelerator.

Examples of the curing accelerator include triphenylphosphine, a boron trifluoride-amine complex, and the compound described in paragraph 0052 in JP2012-67225A. In addition to the aforementioned curing accelerators, examples thereof include imidazole-based curing accelerators such as 2-methylimidazole (trade name; 2MZ), 2-undecylimidazole (trade name; C11-Z), 2-heptadecylimidazole (trade name; C17Z), 1,2-dimethylimidazole (trade name; 1.2DMZ), 2-ethyl-4-methylimidazole (trade name; 2E4MZ), 2-phenylimidazole (trade name; 2PZ), 2-phenyl-4-methylimidazole (trade name; 2P4MZ), 1-benzyl-2-methylimidazole (trade name; 1B2MZ), 1-benzyl-2-phenylimidazole (trade name; 1B2PZ), 1-cyanoethyl-2-methylimidazole (trade name; 2MZ-CN), 1-cyanoethyl-2-undecylimidazole (trade name; C11Z-CN), 1-cyanoethyl-2-phenylimidazolium trimellitate (trade name; 2PZCNS-PW), 2,4-diamino-6-[2'-methylimidazolyl-(1')]-ethyl-s-triazine (trade name; 2MZ-A), 2,4-diamino-6-[2'-undecylimidazolyl-(1')]-ethyl-s-triazine (trade name; C11Z-A), 2,4-diamino-6-[2'-ethyl-4'-methylimidazolyl-(1')]-ethyl-s-triazine (trade name; 2E4MZ-A), 2,4-diamino-6-[2'-methylimidazolyl-(1')]-ethyl-s-triazine isocyanuric acid adduct (trade name; 2MA-OK), 2-phenyl-4,5-dihydroxymethylimidazole (trade name; 2PHZ-PW), 2-phenyl-4-methyl-5-hydroxymethylimidazole (trade name; 2P4MHZ-PW), 1-cyanoethyl-2-phenylimidazole (trade name; 2PZ-CN), and 2,4-diamino-6-[2'-methylimidazolyl-(1')]ethyl-s-triazine (trade name; 2MZA-PW), and 2,4-diamino-6-[2'-methylimidazolyl-(1')]-ethyl-s-triazine isocyanuric acid adduct (trade name; 2MAOK-PW) (all produced by SHIKOKU CHEMICALS CORPORATION).

One kind of the curing accelerators may be used singly, or two or more kinds thereof may be used.

In a case where the composition contains the curing accelerator, a content of the curing accelerator is preferably 0.01% to 10% by mass and more preferably 0.1% to 5% by mass, with respect to the total content of the phenolic compound and the epoxy compound.

[Dispersant]

The composition may further contain a dispersant.

In a case where the composition contains a dispersant, the dispersibility of the inorganic substance in the composition is improved, and thus superior thermal conductivity and adhesiveness can be achieved.

The dispersant can be appropriately selected from commonly used dispersants, for example. Examples thereof include DISPERBYK-106 (produced by BYK-Chemie GmbH), DISPERBYK-111 (produced by BYK-Chemie GmbH), ED-113 (produced by Kusumoto Chemicals, Ltd.), AJISPER PN-411 (produced by Ajinomoto Fine-Techno Co., Inc.), and REB122-4 (produced by Showa Denko Materials Co., Ltd.).

One kind of the dispersants may be used singly, or two or more kinds thereof may be used.

In a case where the composition contains the dispersant, a content of the dispersant is preferably 0.01% to 10% by mass and more preferably 0.1% to 5% by mass, with respect to the content of the inorganic substance.

[Solvent]

The composition may further contain a solvent.

A kind of the solvent is not particularly limited, and an organic solvent is preferable. Examples of the organic solvent include cyclopentanone, cyclohexanone, ethyl acetate, methyl ethyl ketone, dichloromethane, and tetrahydrofuran.

In a case where the composition contains a solvent, a content of the solvent is preferably an amount such that the concentration of the solid contents in the composition is 20% to 90% by mass, more preferably an amount such that the concentration is 30% to 85% by mass, and even more preferably an amount such that the concentration is 40% to 85% by mass.

[Method for Producing Composition]

A method for producing the composition is not particularly limited, known methods can be adopted, and for example, the composition can be produced by mixing the aforementioned various components. In a case of mixing, the various components may be mixed at a time or mixed sequentially.

Further, as described above, in a case of mixing, a method in which a surface-modified inorganic substance (surface-modified inorganic substance X, surface-modified inorganic substance A, and/or surface-modified inorganic substance B) is separately prepared, and then the separately prepared surface-modified inorganic substance is mixed with other raw materials of the composition may be performed, a method in which a surface modifier (surface modifier A and/or surface modifier B) and an inorganic substance are mixed with other raw materials of the composition, and a surface-modified inorganic substance is prepared in the obtained mixing system may be performed, or both methods thereof may be performed.

A method for mixing the components is not particularly limited, and known methods can be used. A mixing device used for the mixing is preferably a submerged disperser, and examples thereof include a rotating and revolving mixer, a stirrer such as a high-speed rotating shear-type stirrer, a colloid mill, a roll mill, a high-pressure injection-type disperser, an ultrasonic disperser, a beads mill, and a homogenizer. One kind of the mixing devices may be used singly, or two or more kinds thereof may be used. A deaeration treatment may be performed before and after the mixing and/or simultaneously with the mixing.

[Method for Curing Composition]

The composition according to the embodiment of the present invention is preferably a composition for forming a thermally conductive material.

The composition according to the embodiment of the present invention is subjected to a curing treatment to obtain a thermally conductive material.

A method for curing the composition is not particularly limited, but a thermal curing reaction is preferable.

A heating temperature during the thermal curing reaction is not particularly limited. For example, the heating temperature may be appropriately selected within the range of 50° C. to 250° C. Moreover, in a case where the thermal curing reaction is performed, a heating treatment at different temperatures may be performed a plurality of times.

The curing treatment is preferably performed on the composition which is formed in a film shape or a sheet shape. Specifically, for example, the composition may be applied to form a film, and a curing reaction may be performed.

In a case where the curing treatment is performed, it is preferable to apply the composition onto a substrate to form a coating film, and then cure the coating film. In this case, after further bringing the coating film formed on the substrate into contact with another substrate, the curing treatment may be performed. A cured substance (thermally conductive material) obtained after the curing may or may not be separated from one or both of the substrates.

Furthermore, in a case where the curing treatment is performed, after applying the composition onto different substrates to form respective coating films, the curing treatment may be performed in a state where the obtained coating films are in contact with each other. A cured substance (thermally conductive material) obtained after the curing may or may not be separated from one or both of the substrates.

In addition, the curing treatment may be completed when the composition is in a semi-cured state. Further, after the composition is in a semi-cured state, curing treatment may be further carried out to complete the curing.

The curing treatment for bringing the composition into a semi-cured state (also referred to as "semi-curing treatment") and the curing treatment for completely curing (also referred to as "main curing treatment") are divided into separate steps.

For example, in the semi-curing treatment, a composition may be applied onto a substrate to form a coating film, and then the coating film on the substrate is heated without pressure to obtain a semi-cured thermally conductive material (also referred to as "semi-cured film"), or a semi-cured film may be obtained by heating the coating film on the substrate while using press working in combination. In a case where the press working is performed, the press working may be performed before or after the above heating or the like, or may be performed during the press working. In a case where press working is performed in the semi-curing treatment, it may be easy to adjust the film thickness of the obtained semi-cured film and/or reduce the amount of voids in the semi-cured film.

In the semi-curing treatment, the semi-curing treatment may be performed in a state where the coating films formed on different substrates are laminated, or the semi-curing treatment may be performed without laminating the coating films. The semi-curing treatment may be performed in a state where the coating film formed from the composition is further brought into contact with a material other than the coating film.

The obtained semi-cured film may be used as a thermally conductive material as it is, or may be used as a completely cured thermally conductive material after the semi-cured film is further subjected to the main curing treatment.

In the main curing treatment, the semi-cured film may be heated without pressure as it is, or may be heated after performing press working or while performing thereof. At this time, in the main curing treatment, the main curing treatment may be performed in a state where the separate semi-cured films are laminated, or the main curing treatment may be performed without laminating the semi-cured films.

In addition, the main curing treatment may be performed in a state where the semi-cured film is disposed so as to be in contact with the device or the like to be used. It is also preferable that the device and the thermally conductive material of the present invention adhere to each other by the main curing treatment.

The press used for the press working that may be performed during the semi-curing treatment and/or the curing treatment in the main curing treatment is not limited, and for example, a flat plate press may be used or a roll press may be used.

In a case where the roll press is used, for example, it is preferable that a substrate with a coating film, which is obtained by forming a coating film on a substrate, is sandwiched between a pair of rolls in which two rolls face each other, and while rotating the pair of rolls to cause the substrate with a coating film to be passed, pressure is applied in a film thickness direction of the substrate with a coating film. In the substrate with a coating film, a substrate may be present on only one surface of a coating film, or a substrate may be present on both surfaces of a coating film. The substrate with a coating film may be passed through the roll press only once or a plurality of times.

During the semi-curing treatment and/or the curing treatment in the main curing treatment or the like, only one of the treatment by the flat plate press and the treatment by the roll press may be performed, or both may be performed.

Regarding the preparation of the thermally conductive material including a curing reaction, "Highly Thermally Conductive Composite Material" (CMC Publishing CO., LTD., written by Yoshitaka TAKEZAWA) can be referred to.

A shape of the thermally conductive material is not particularly limited, and the thermally conductive material can be molded into various shapes according to the use. Examples of a typical shape of the molded thermally conductive material include a sheet shape.

That is, it is also preferable that the thermally conductive material formed of the composition according to the embodiment of the present invention is a thermally conductive sheet.

Furthermore, the thermally conductive properties of the thermally conductive material formed of the composition according to the embodiment of the present invention are preferably isotropic rather than anisotropic.

The thermally conductive material preferably has insulating properties (electrical insulating properties). In other words, the composition according to the embodiment of the present invention is preferably a thermally conductive insulating composition.

For example, a volume resistivity of the thermally conductive material at 23° C. and a relative humidity of 65% is preferably $10^{10}$ Ω·cm or greater, more preferably $10^{12}$ Ω·cm or greater, and even more preferably $10^{14}$ Ω·cm or greater. The upper limit thereof is not particularly limited, but is generally $10^{18}$ Ω·cm or less.

[Use of Thermally Conductive Material]

The thermally conductive material formed of the composition according to the embodiment of the present invention can be used as a heat dissipation material such as a heat dissipation sheet, and can be used for dissipating heat from various devices. More specifically, a device with a thermally conductive layer is prepared by disposing a thermally conductive layer, which contains the thermally conductive material of the present invention, on a device, and thus the heat generated from the device can be efficiently dissipated by the thermally conductive layer. The thermally conductive layer may be a thermally conductive layer including a thermally conductive multilayer sheet which will be described later.

The thermally conductive material formed of the composition according to the embodiment of the present invention has sufficient thermally conductive properties and high heat resistance, and thus is suitable for dissipating heat from a power semiconductor device used in various electrical machines such as a personal computer, a general household electric appliance, and an automobile.

Furthermore, the thermally conductive material formed of the composition according to the embodiment of the present invention has sufficient thermally conductive properties even in a semi-cured state, and thus can also be used as a heat dissipation material which is disposed in a portion where light for photocuring is hardly reached, such as a gap between members of various devices. Moreover, the thermally conductive material also has excellent adhesiveness, and thus can also be used as an adhesive having thermally conductive properties.

The thermally conductive material formed of the composition according to the embodiment of the present invention may be used in combination with members other than the members formed of the present composition.

For example, a sheet-shaped thermally conductive material (thermally conductive sheet) may be combined with a sheet-shaped support in addition to the layer formed of the present composition.

Examples of the sheet-shaped support include a plastic film, a metal film, and a glass plate. Examples of a material for the plastic film include polyester such as polyethylene terephthalate (PET), polycarbonate, an acrylic resin, an epoxy resin, polyurethane, polyamide, polyolefin, a cellulose derivative, and silicone. Examples of the metal film include a copper film.

A film thickness of the sheet-shaped thermally conductive material (thermally conductive sheet) is preferably 100 to 300 μm and more preferably 150 to 250 μm.

Moreover, an adhesive layer and/or a pressure sensitive adhesive layer may be combined with the thermally conductive material (preferably thermally conductive sheet).

By bonding the thermally conductive material to an object to which heat is to be transferred, such as a device, via such an adhesive layer and/or a pressure sensitive adhesive layer, firmer bonding between the thermally conductive material and the object can be achieved.

For example, as the thermally conductive multilayer sheet, a thermally conductive multilayer sheet having a thermally conductive sheet and an adhesive layer or a pressure sensitive adhesive layer, which is provided on one surface or both surfaces of the thermally conductive sheet, may be prepared.

Furthermore, on one surface or both surfaces of the thermally conductive sheet, one of the adhesive layer and the pressure sensitive adhesive layer may be provided, or the both layers may be provided. The adhesive layer may be provided on one surface of the thermally conductive sheet, and the pressure sensitive adhesive layer may be provided on the other surface thereof. Moreover, on one surface or both surfaces of the thermally conductive sheet, the adhesive layer and/or the pressure sensitive adhesive layer may be partially provided, or may be provided over the entire surface.

As described above, the thermally conductive material such as the thermally conductive sheet in the present invention may be in a semi-cured state (semi-cured film), and the thermally conductive sheet in the thermally conductive multilayer sheet may be in a semi-cured state. The adhesive layer in the thermally conductive multilayer sheet may be cured, may be in a semi-cured state, or may be in an uncured state.

<Adhesive Material Layer>

The adhesive layer preferably contains at least one kind of compound (a resin and/or a low-molecular-weight body) having adhesiveness.

The adhesive layer may further contain other components such as a filler, if necessary.

As the compound having adhesiveness, a compound having insulating properties, adhesiveness, and/or flexibility, during adhesion, is preferable.

In particular, from the viewpoints of the adhesiveness and the insulating properties, it is preferable to contain at least one kind selected from the group consisting of a polyimide resin, a modified polyimide resin, a polyamide imide resin, a modified polyamide imide resin, and an epoxy compound.

The epoxy compound may be an epoxy resin containing an acryl-modified rubber.

Examples of the polyimide resin and the modified polyimide resin include products represented by UPICOAT FS-100L (produced by UBE INDUSTRIES, LTD.), SEMICOFINE SP-300, SP-400, and SP-800 (produced by TORAY INDUSTRIES, INC.), U-IMIDE SERIES (produced by UNITIKA LTD.), and the like.

Examples of the polyamide imide resin or the modified polyamide imide resin include KS SERIES (produced by Showa Denko Materials Co., Ltd.), VYLOMAX SERIES (produced by TOYOBO CO., LTD.), and TORLON (produced by SOLVAY SPECIAL POLYMERS JAPAN K. K.).

Among them, from the viewpoints of high heat resistance and high adhesiveness, it is preferable to use a modified polyamide imide resin represented by KS SERIES (produced by Showa Denko Materials Co., Ltd.).

One kind of the polyimide resin, the polyamide imide resin, and the modified polyamide imide resin, which are used for the adhesive layer, may be used singly, or two or more kinds thereof may be used.

Moreover, these resins are generally in a varnish state where the resin is dissolved in a solvent, and can also be used as an adhesive layer by applying the resin directly to a support such as a PET film and drying the solvent to form a film.

Furthermore, an epoxy compound may be used as the compound having adhesiveness. Specifically, for example, an epoxy composition containing an epoxy compound, a curing agent therefor, and a curing accelerator may be used as the adhesive layer. It is also preferable that glycidyl acrylate is added to the epoxy composition.

For details of the epoxy composition, for example, the descriptions of JP2002-134531A, JP2002-226796A, 2003-221573A, and the like can also be referred to.

The epoxy compound used for the adhesive layer is not particularly limited as long as the epoxy compound is cured to exhibit an adhesive action. For example, in a case where a bisphenol A-type or bisphenol F-type liquid epoxy compound having a molecular weight of 500 or less is used, fluidity during lamination can be improved. A polyfunctional epoxy compound may be added for the purpose of increasing a glass transition temperature (Tg), and examples of the polyfunctional epoxy compound include a phenol novolac-type epoxy compound and a cresol novolac-type epoxy compound.

As the epoxy compound used for the adhesive layer, the epoxy compounds described as the epoxy compound, which can be used in the composition according to the embodiment of the present invention, may be used.

Examples of the curing agent for the epoxy compound include polyamide, polyamine, an acid anhydride, polysulfide, boron trifluoride, or a phenolic compound (a phenol novolac resin, and bisphenol A, bisphenol F, bisphenol S, or the like, which is a compound having two or more phenolic hydroxyl groups in one molecule). From the viewpoint of excellent electrolytic corrosion resistance during moisture absorption, it is also preferable to use a phenol novolac resin, a bisphenol novolac resin, a cresol novolac resin, or the like, which is a phenolic compound.

Moreover, as the curing agent, the phenolic compounds described as the phenolic compound, which can be used in the composition according to the embodiment of the present invention, may be used.

In a case where the curing agent is used, it is preferable to use a curing accelerator together with the curing agent. It is also preferable to use imidazole as the curing accelerator. Examples of the imidazole include 2-methylimidazole, 2-ethyl-4-methylimidazole, 1-cyanoethyl-2-phenylimidazole, and 1-cyanoethyl-2-phenylimidazolium trimellitate. The imidazoles are commercially available, for example, from SHIKOKU CHEMICALS CORPORATION under the trade names of 2E4MZ, 2PZ-CN, and 2PZ-CNS.

As the curing accelerator, the curing accelerators described as the effect promoter (triphenylphosphine or the like), which can be used in the composition according to the embodiment of the present invention, may be used.

It is also preferable that the epoxy compound used for the adhesive layer is used in combination with a high-molecular-weight resin compatible with the epoxy compound.

Examples of the high-molecular-weight resin compatible with the epoxy compound include a high-molecular-weight epoxy compound, a highly polar functional group-containing rubber, and a highly polar functional group-containing reactive rubber.

Examples of the highly polar functional group-containing reactive rubber include an acryl-modified rubber obtained by adding a highly polar functional group such as a carboxyl group to an acrylic rubber.

Here, being compatible with the epoxy compound means a property of forming a homogeneous mixture without being divided into two or more phases by being separated from the epoxy compound after curing.

A weight-average molecular weight of the high-molecular-weight resin is not particularly limited. From the viewpoints that tackiness of the adhesive in a B stage is reduced, or flexibility during curing is improved, the weight-average molecular weight is preferably 30,000 or greater.

The high-molecular-weight epoxy compound includes a high-molecular-weight epoxy compound having a molecular weight of 30,000 to 80,000, and an ultra-high-molecular-weight epoxy compound having a molecular weight of greater than 80,000 (refer to JP1995-59617B (JP-H07-59617B), JP1995-59618B (JP-H07-59618B), JP1995-59619B (JP-H07-59619B), JP1995-59620B (JP-H07-59620B), JP1995-64911B (JP-H07-64911B), and JP1995-68327B (JP-1107-68327B)), both of which are produced by Showa Denko Materials Co., Ltd. As a carboxyl group-containing acrylic rubber, which is the highly polar functional group-containing reactive rubber, HTR-860P (trade name) is sold, for example, by Nagase ChemteX Corporation.

In a case where the high-molecular-weight resin which is compatible with the epoxy compound and has a weight-average molecular weight of 30,000 or greater is used, and the resin constituting the adhesive layer is 100 parts by mass, the addition amount thereof is preferably 10 parts by mass or greater, and preferably 40 parts by weight or less.

In a case where the addition amount is 10 parts by mass or greater, improvement in flexibility of a phase (hereinafter, referred to as an epoxy compound phase) containing the epoxy compound as a main component, improvement in tackiness, and/or suppression of cracks is likely to be achieved, and insulating properties are less likely to deteriorate. In a case where the addition amount is 40 parts by weight or less, a Tg of the epoxy compound phase can be improved.

A weight-average molecular weight of the high-molecular-weight epoxy compound is preferably 20,000 or more and 500,000 or less. Within this range, the strength and/or flexibility in a sheet state and/or a film state is improved, and tackiness is also likely to be suppressed.

One kind of the polyamide imide resin, the modified polyamide imide resin, and the epoxy compound, which are suitably used for the adhesive layer, may be used singly, or two or more kinds thereof may be used.

Moreover, these compounds may be a mixture in a varnish state where the compounds are dissolved in a solvent. By applying such a mixture directly to a support such as a PET film and drying the solvent, the compounds are formed into a film, and can be used as an adhesive layer.

(Silane Coupling Agent)

A silane coupling agent may be formulated in the adhesive layer in order to improve an interfacial bond between different kinds of materials.

Examples of the silane coupling agent include γ-glycidoxypropyltrimethoxysilane, γ-mercaptopropyltrimethoxysilane, γ-aminopropyltriethoxysilane, γ-ureidopropyltriethoxysilane, and N-β-aminoethyl-γ-aminopropyltrimethoxysilane.

Among them, from the viewpoint of adhesive strength, γ-mercaptopropyltrimethoxysilane or γ-aminopropyltriethoxysilane is preferable.

In a case where the adhesive layer contains the silane coupling agent, a formulation amount thereof is preferably 0.1 to 10 parts by mass with respect to 100 parts by mass of the compound having adhesiveness, from the viewpoint of an effect of addition and/or an influence on heat resistance.

(Filler)

The adhesive layer may contain a filler (preferably an inorganic filler).

In a case where the adhesive layer contains the filler, the handleability or thermally conductive properties of the adhesive layer are improved. Moreover, it is possible to impart flame retardance, adjust a melt viscosity, impart thixotropic properties, and/or improve surface hardness.

In a case where the adhesive layer contains the filler, a content thereof is not particularly limited. In particular, the content is preferably 20 to 50 parts by volume with respect to 100 parts by volume of the compound having the adhesiveness, which is contained in the adhesive layer.

From the viewpoint of an effect of the formulation, the content is more preferably 30 parts by volume or greater. Moreover, from the viewpoints that deterioration in insulating properties or the like is suppressed by achieving optimization of a storage elastic modulus of the adhesive, improvement in adhesiveness, and/or suppression of voids, it is also preferable that the content is 50 parts by volume or less.

Examples of the inorganic filler include aluminum hydroxide, magnesium hydroxide, calcium carbonate, magnesium carbonate, calcium silicate, magnesium silicate, calcium oxide, magnesium oxide, alumina (aluminum oxide), aluminum nitride, aluminum borate whisker, boron nitride, crystalline silica, amorphous silica, silicon nitride, talc, mica, and barium sulfate.

Among them, from the viewpoints that heat dissipating properties are favorable due to high thermal conductivity, impurities are likely to be controlled, and heat resistance and insulating properties are favorable, alumina, boron nitride, or aluminum nitride is preferable.

One kind of the fillers may be used singly, or two or more kinds thereof may be used.

An average particle diameter of the filler contained in the adhesive layer is not particularly limited. For example, from the viewpoint of thermally conductive properties, the average particle diameter is preferably 0.1 to 10 μm and more preferably 0.2 to 5 μm.

From the viewpoint of balancing adhesiveness and thermally conductive properties, it is also preferable that a content of the filler in the adhesive layer is 50% by volume or less (for example, 20% by volume or more and 50% by volume or less) with respect to the total volume of the adhesive layer.

From the viewpoints of adhesive strength and thermal conductivity, it is particularly preferable that the adhesive layer contains, as the compound having adhesiveness, at least one kind selected from the group consisting of the epoxy compound and the modified polyamide imide resin, and contains, as the filler, at least one kind selected from the group consisting of alumina and silicon oxide, the content of the filler is 25 parts by volume or more and 100 parts by volume or less with respect to 100 parts by volume of the compound having adhesiveness, and the average particle diameter of the filler is 0.2 to 5 μm.

The film thickness of the adhesive layer is preferably 1 to 16 μm, more preferably 2 to 15 μm, even more preferably 3 to 14 μm, and particularly preferably 4 to 12 μm, from the viewpoints of thermal conductivity and adhesiveness.

The film thickness of the adhesive layer can be measured using a micrometer, a stylus-type film thickness meter, a needle-type film thickness meter, or the like.

<Pressure Sensitive Adhesive Layer>

As a material for the pressure sensitive adhesive layer, various pressure sensitive adhesives and/or thermosetting materials can be used without particular limitation as long as these materials have the required heat resistance performance and thermally conductive performance. Moreover, a pressure sensitive adhesive of which the thermally conductive properties are improved by mixing various thermally conductive fillers in the pressure sensitive adhesive layer may be used.

Examples of the pressure sensitive adhesive, which forms the pressure sensitive adhesive layer, include an acrylic pressure sensitive adhesive, an olefin-based pressure sensitive adhesive, a silicone-based pressure sensitive adhesive, a natural rubber-based pressure sensitive adhesive, and a synthetic rubber-based pressure sensitive adhesive.

From the viewpoint that outgas is less likely to be generated in the use near a semiconductor in an electronic machine, an acrylic pressure sensitive adhesive or an olefin-based pressure sensitive adhesive is preferable. Moreover, from the viewpoint of heat resistance, a silicone-based pressure sensitive adhesive containing a silicone resin as a main raw material is preferable.

Furthermore, the "pressure sensitive adhesive containing a silicone resin as a main raw material" is a pressure sensitive adhesive containing 60% by mass or greater (preferably 80% by mass or greater) of the silicone resin.

Examples of the pressure sensitive adhesive containing a silicone resin as a main raw material include a peroxide crosslinking (curing)-type silicone-based pressure sensitive adhesive and an addition reaction-type silicone-based pressure sensitive adhesive. Among them, from the viewpoints that the thickness accuracy is high in a case of being formed into a thin layer, and the pressure sensitive adhesive layer can be easily formed by a transfer method, an addition reaction-type silicone-based pressure sensitive adhesive is preferable.

Examples of the addition reaction-type silicone-based pressure sensitive adhesive include pressure sensitive adhesives which contain a silicone rubber and a silicone resin, and further contain, if necessary, an additive such as a crosslinking agent, a filling agent, a plasticizer, an antiaging agent, an antistatic agent, and/or a colorant (a pigment, a dye, or the like).

The silicone rubber is not particularly limited as long as the silicone rubber is a silicone-based rubber component, but a silicone rubber, which contains an organopolysiloxane (in particular, organopolysiloxane having methylphenylsiloxane as a main constitutional unit) having a phenyl group, is preferable. Various functional groups such as a vinyl group may be introduced into organopolysiloxane in such a silicone rubber, if necessary.

The silicone resin is not particularly limited as long as the silicone resin is a silicone-based resin used for a silicone-based pressure sensitive adhesive, and examples thereof include a silicone resin which contains organopolysiloxane consisting of a (co)polymer having at least one kind of unit selected from the group consisting of a unit consisting of a constitutional unit "$R_3SiO_{1/2}$", a unit consisting of a constitutional unit "$SiO_2$", a unit consisting of a constitutional unit "$RSiO_{3/2}$", and a unit consisting of a constitutional unit "$R_2SiO$". Furthermore, R in the constitutional unit represents a hydrocarbon group or a hydroxyl group.

Examples of the acrylic pressure sensitive adhesive include a homopolymer and a copolymer of (meth)acrylic acid and/or (meth)acrylic acid ester.

Among them, from the viewpoint of flexibility, chemical stability, workability, and/or controllability of pressure sensitive adhesive properties are superior, the acrylic pressure sensitive adhesive is preferably a poly(meth)acrylic acid ester-based high-molecular-weight compound containing butyl acrylate, 2-ethylhexyl acrylate, or the like as a main raw material component.

The high-molecular-weight compound is preferably a copolymer having a structure in which a polar group such as a —COOH group, a —CN group, and an —OH group is introduced by copolymerizing one or more monomers selected from butyl acrylate, ethyl acrylate, 2-ethylhexyl acrylate, and the like with acrylic acid, acrylonitrile, and/or hydroxyethyl acrylate.

In addition, a crosslinked structure may be introduced into the acrylic pressure sensitive adhesive as long as flexibility is not impaired. By introducing the crosslinked structure, long-term close adhesion retaining properties and film hardness are likely to be improved. For example, the crosslinked structure can be introduced to a polymer having a polar group such as an —OH group by reacting, with the polar group, a compound having a functional group, such as a plurality of isocyanate groups or epoxy groups, which is bonded to the polar group.

[Surface-Modified Inorganic Substance]

The present invention also includes an invention of surface-modified inorganic substances.

The surface-modified inorganic substances are as described above in the description in the composition according to the embodiment of the present invention.

EXAMPLES

Hereinafter, the present invention will be described in more detail based on Examples. The materials, the amount and proportion of the materials used, the details of treatments, the procedure of treatments, and the like shown in the following Examples can be appropriately changed within a range that does not depart from the gist of the present invention. Accordingly, the scope of the present invention is not limitedly interpreted by the following Examples.

Example X

A compound A-1 (75 mg, compound corresponding to surface modifier A) shown in the latter stage was dissolved in THF (250 mL, tetrahydrofuran) to obtain an A-1 solution. Boron nitride "HP40 MF-100" (100 g) produced by MIZUSHIMA FERROALLOY CO., LTD was added to this A-1 solution and stirred overnight to perform an adsorption treatment. After the adsorption treatment, the obtained slurry liquid was filtered and separated into a filtrate and a filtered product. By drying the collected powder (the aforementioned filtered product), a surface-modified BN (BN-A1) modified with the compound A-1 was obtained. From the difference between the absorption spectrum of the A-1 solution before the addition of boron nitride and the absorption spectrum of the filtrate after the adsorption treatment, the adsorption amount of compound A-1 per 1 g of boron nitride was calculated to be 0.40 mg.

BN-A1 corresponds to the surface-modified inorganic substance A.

By the same method, a surface-modified BN (BN-B1) surface-modified with the compound B-1 (compound corresponding to the surface modifier B) shown in the latter stage was obtained. The amount of compound B-1 adsorbed per 1 g of boron nitride was calculated to be 0.38 mg.

BN-B1 corresponds to the surface-modified inorganic substance B.

The compound A-1 (37.5 mg) and the compound B-1 (37.5 mg) were dissolved in THF (250 mL) to obtain an A-1/B-1 solution. Boron nitride "HP40 MF-100" (100 g) produced by MIZUSHIMA FERROALLOY CO., LTD was added to this A-1/B-1 solution and stirred overnight to perform an adsorption treatment. After the adsorption treatment, the obtained slurry liquid was filtered and separated into a filtrate and a filtered product. By drying the collected powder (the aforementioned filtered product), a surface-modified BN (BN-A1B1) modified with the compound A-1 and the compound B-1 was obtained. From the difference between the absorption spectrum of the A-1/B-1 solution before the addition of boron nitride and the absorption spectrum of the filtrate after the adsorption treatment, the amount of the compound A-1 and the compound B-1 adsorbed per 1 g of boron nitride was calculated to be 0.39 mg in total.

BN-A1B1 corresponds to the surface-modified inorganic substance X.

From the above results, it was confirmed that compound A-1 and/or compound B-1 were adsorbed on the surface of the inorganic substance (boron nitride).

It was confirmed that compounds A-2 to A-8 (corresponding to surface modifier A) and compounds B-2 to B-9 (corresponding to surface modifier B) used in Examples described later were similarly adsorbed on the surface of inorganic substances (boron nitride and the like).

Example Y

[Preparation and Evaluation of Composition]

[Various Components]

Various components used in Examples or Comparative Examples will be shown below.

<Thermosetting Compound>

(Epoxy Compound)

Epoxy compounds used in Examples or Comparative Examples will be shown below.

Moreover, epoxy compound C-2 is a mixture of two kinds of epoxy compounds (trade name: EPOTOHTO ZX-1059, produced by Tohto Chemical Industry Co., Ltd.).

Epoxy compound C-4 is EPPN-502H produced by Nippon Kayaku Co., Ltd.

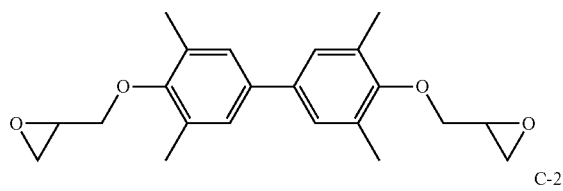

C-1

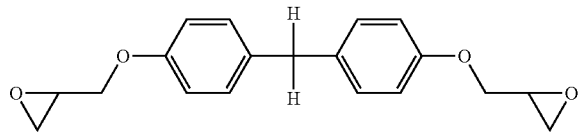

C-2

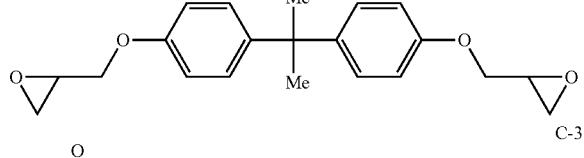

C-3

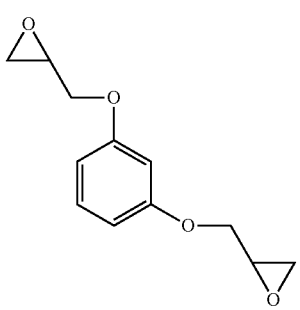

C-4
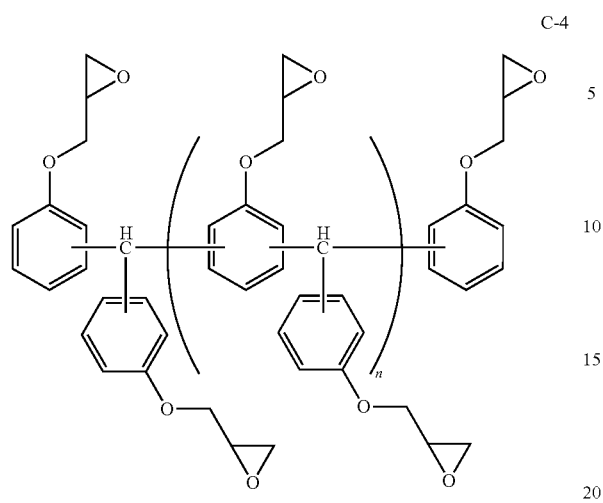
D-4
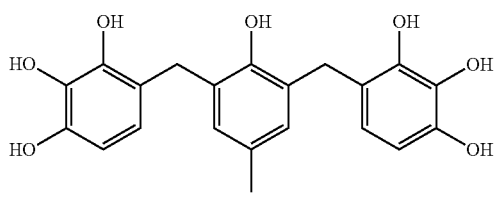
(Phenolic Compound)
Phenolic compounds used in Examples or Comparative Examples will be shown below.
A phenolic compound D-5 is MEH-7500 produced by Meiwa Plastic Industries, Ltd.
D-5
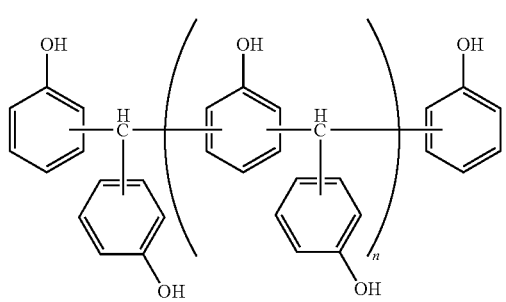
D-1
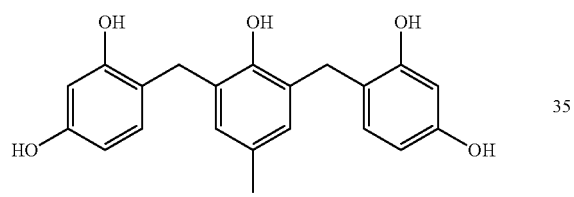
D-6
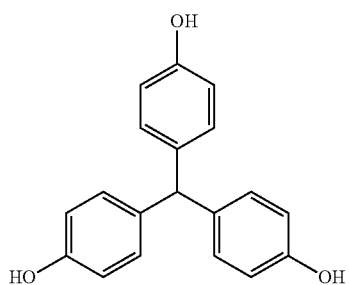
D-2
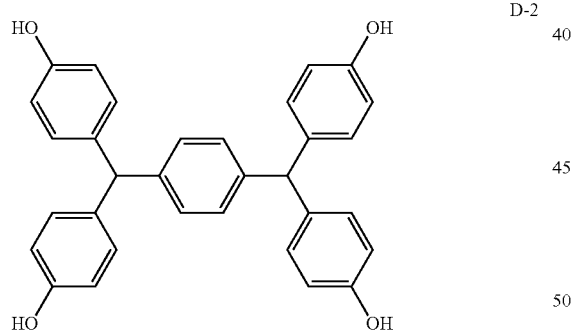
(D-7)
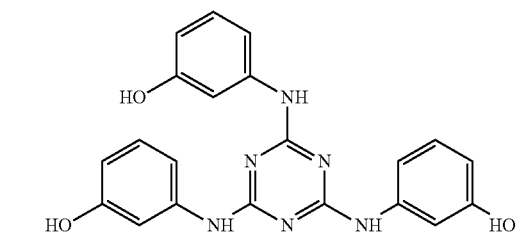
D-3
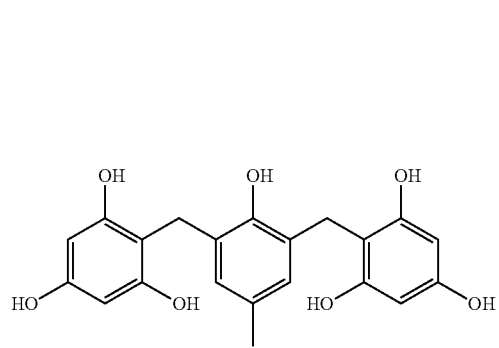
<Surface Modifier>
(Surface Modifier A)
The surface modifier A used in Examples or Comparative Examples is shown below.

A-1
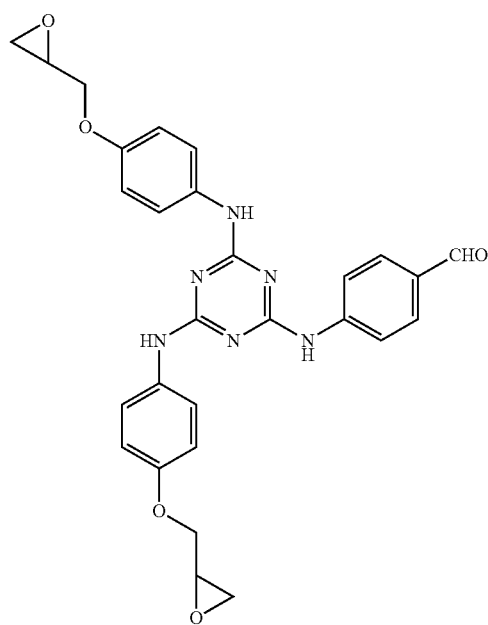
A-3
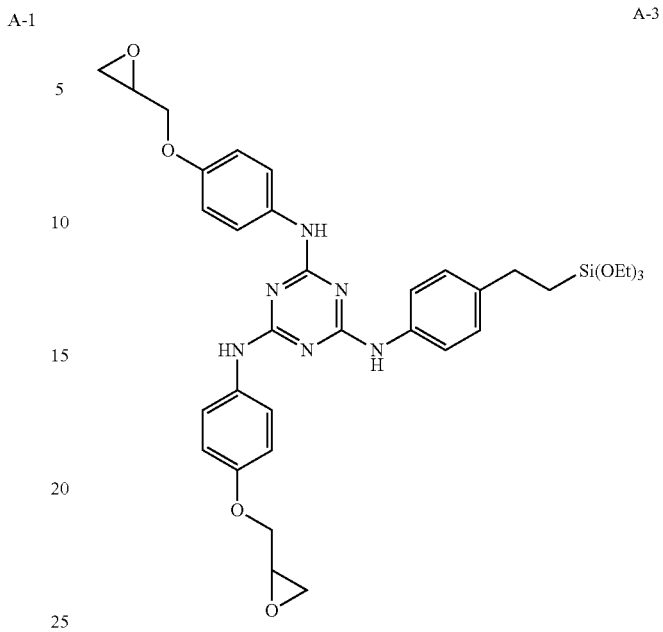
A-4
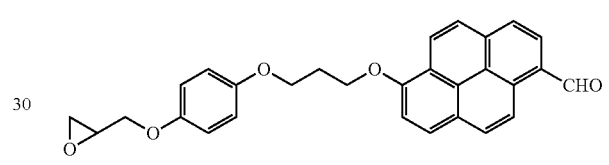
A-5
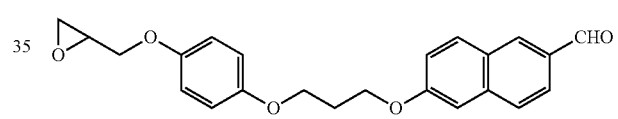
A-6
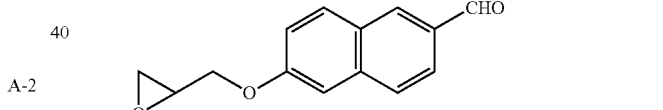
A-2
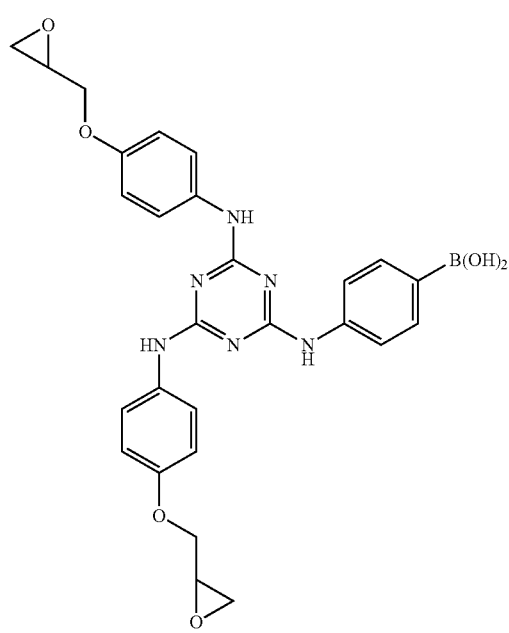
A-7
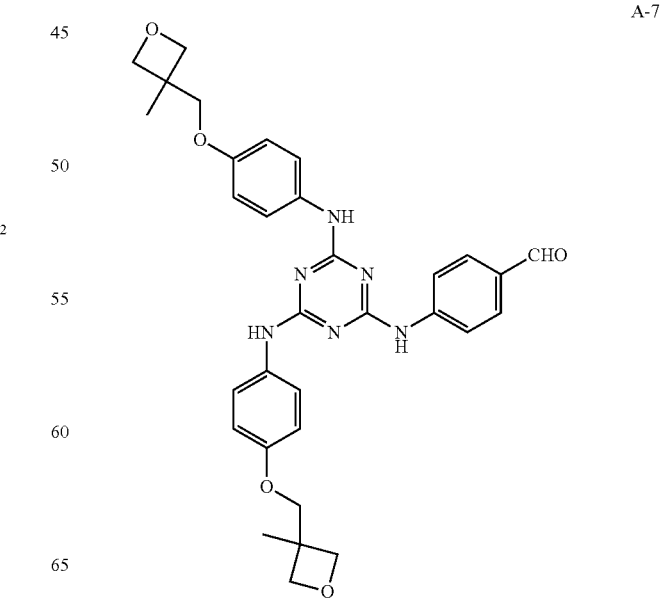

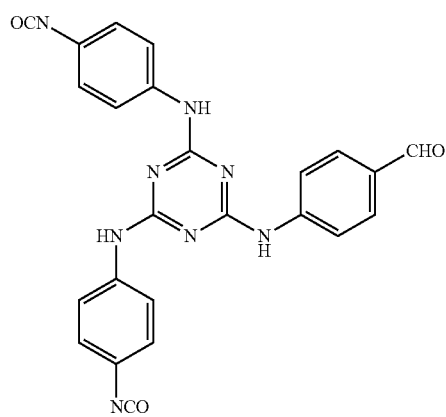
A-8
(Surface Modifier B)
The surface modifier B used in Examples or Comparative Examples is shown below.
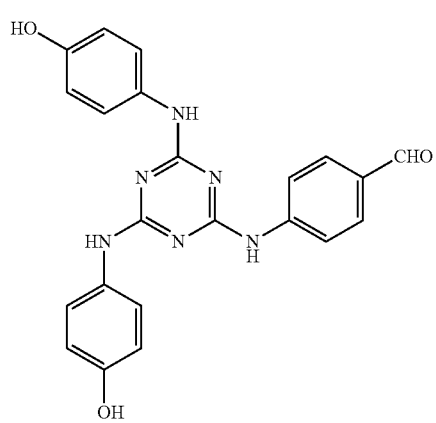
B-1
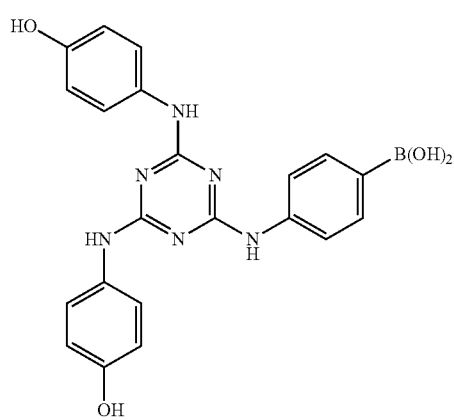
B-2
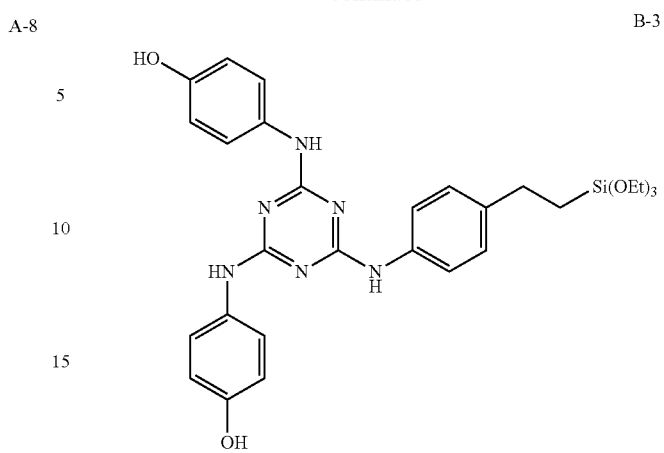
B-3
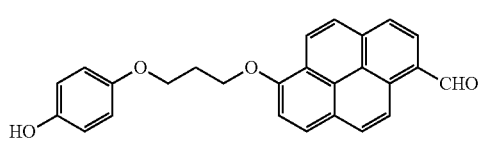
B-4
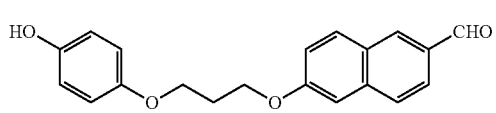
B-5
B-6
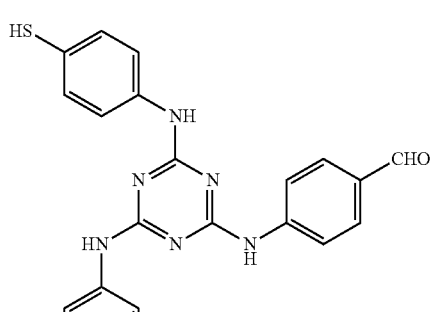
B-7
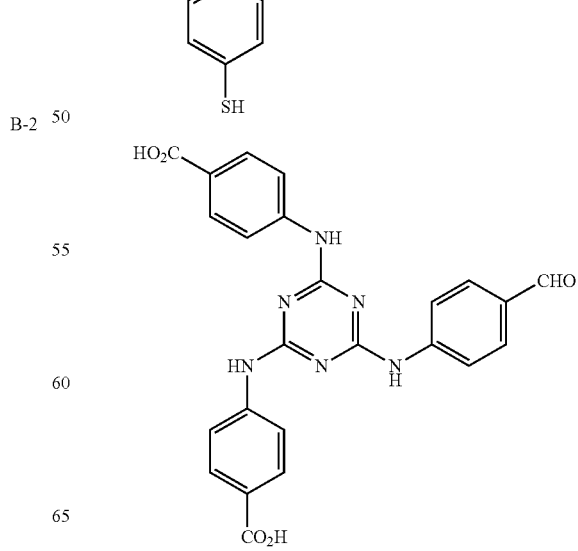
B-8

-continued

B-9

[Chemical structure: triazine core with three NH linkages to aromatic groups: one to 4-aminophenyl, one to phenethyl-Si(OEt)₃, and one to 4-aminophenyl]

(Compound for Comparison)

Compounds for comparison used in Examples and Comparative Examples will be shown below.

A-9

(EtO)₃Si-propyl-O-CH₂-epoxide

B-10

(MeO)₃Si-propyl-NH₂

<Inorganic Substances (Inorganic Nitride and Inorganic Oxide)>

Inorganic substances used in Examples or Comparative Examples will be shown below.

"AA-3": Aluminum oxide (average particle diameter: 3 μm, produced by Sumitomo Chemical Co., Ltd.)

"AA-04": Aluminum oxide (average particle diameter: 0.4 μm, produced by Sumitomo Chemical Co., Ltd.)

"HP40 MF100": Aggregation-shaped boron nitride (average particle diameter: 40 μm, produced by MIZUSHIMA FERROALLOY CO., LTD.)

<Surface-Modified Inorganic Substance>

Surface-modified inorganic substances used in Examples or Comparative Examples will be shown below.

The following methods for producing the surface-modified inorganic substance are as shown in <<Example X>>.

"BN-A1": Surface-modified boron nitride obtained by modifying HP-40 MF100 with compound A-1.

"BN-B1": Surface-modified boron nitride obtained by modifying HP-40 MF100 with compound B-1.

"BN-A1B1": Surface-modified boron nitride obtained by modifying HP-40 MF100 with compound A-1 and compound B-1.

<Curing Accelerator>

Inorganic substances used in Examples or Comparative Examples will be shown below.

"E-1": 2-Phenyl-4,5-dihydroxymethylimidazole (trade name; 2PHZ-PW, produced by SHIKOKU CHEMICALS CORPORATION)

"E-2": 1-Cyanoethyl-2-phenylimidazole (trade name; 2PZ-CN, produced by SHIKOKU CHEMICALS CORPORATION)

"E-3": 1-Cyanoethyl-2-undecylimidazole (trade name; C11Z-CN, produced by SHIKOKU CHEMICALS CORPORATION)

"E-4": 2,4-diamino-6-[2'-methylimidazolyl-(1')]-ethyl-s-triazine (trade name: 2MZA-PW, produced by Shikoku Chemicals Corporation)

"E-5": 2,4-diamino-6-[2'-methylimidazolyl-(1')]-ethyl-s-triazine isocyanuric acid adduct (trade name: 2MAOK-PW, produced by Shikoku Chemicals Corporation)

"E-6": Triphenylphosphine (TPP)

<Dispersant>

DISPERBYK-106 (polymer salt having an acidic group) was used as the dispersant.

<Solvent>

Cyclopentanone was used as the solvent.

[Preparation of Composition]

A curing liquid was prepared by formulating the epoxy compound and the phenolic compound in combination shown in Table 1 below.

The total amount of the obtained curing liquid, the solvent, the dispersant, the surface modifier (or the compound for comparison), and the curing accelerator were mixed in this order, and then an inorganic substance (inorganic nitride, inorganic oxide) was added to obtain a mixture. The obtained mixture was treated for 5 minutes with a rotating and revolving mixer (produced by THINKY CORPORATION, AWATORI RENTARO ARE-310) to obtain a composition (composition for forming a thermally conductive material) of each Example or Comparative Example.

Here, the addition amount of the solvent was set such that the concentration of the solid contents in the composition was 50% to 80% by mass.

Furthermore, the concentration of the solid contents in the composition was adjusted for each composition within the above range so that the viscosities of the compositions were about the same.

Moreover, the inorganic substances were used after being mixed so that a mass ratio between contents of the respective inorganic substances satisfied a relationship shown in Table 1.

However, in Examples 26 and 27, a composition was obtained in the same procedure as those in Examples or Comparative Examples, except that a mixture obtained by adding a separately produced surface-modified inorganic substance instead of the surface modifier and the inorganic substance was obtained.

The formulation of the solid content in the composition of each Example or Comparative Example is shown in Table 1.

The compositions of Examples 28 to 30 are the same compositions, and the preparation methods for test specimens are different in Examples 28 to 30. The compositions of Comparative Examples 5 to 6 are the same compositions, and the preparation methods for test specimens described later are different in Comparative Examples 5 to 6.

[Evaluation]

<Preparation of Test Specimen>

A test specimen used for evaluation was prepared by a preparation method A, a preparation method B, or a preparation method C shown below.

(Preparation Method A: Preparation of Test Specimens of Examples 1 to 28 and Comparative Examples 1 to 4)

Using the compositions of Examples 1 to 28 and Comparative Examples 1 to 4, test specimens were prepared according to the following procedures, respectively.

A prepared composition was uniformly applied onto a release surface of a release-treated polyester film (NP-100A, produced by PANAC CO., LTD, film thickness of 100 μm) by using an applicator, and left to stand at 120° C. for 5 minutes to obtain a coating film.

Two polyester films with such a coating film were prepared, and after attaching the two polyester films with a coating film to coating film surfaces, the two polyester films with a coating film were hot-pressed (treated at a hot plate temperature of 65° C. and a pressure of 20 MPa for one minute) in the air to obtain a semi-cured film. The polyester films were peeled off from the obtained semi-cured film, sandwiched between an aluminum plate and a copper foil, and hot-pressed in the air (hot-pressed at a hot plate temperature of 180° C. and a pressure of 5 MPa for 5 minutes, and then further hot-pressed at 180° C. under normal pressure for 90 minutes) to obtain an aluminum base substrate with copper foil.

(Preparation Method B: Preparation of Test Specimen of Example 29)

Using the composition of Example 29, a test specimen was prepared according to the following procedure.

Using an applicator, the prepared composition was uniformly applied onto a release surface of a release-treated PET film (PET756501, produced by LINTEC Corporation, film thickness of 75 μm), and left to stand at 120° C. for 4 minutes to obtain a coating film.

A new polyester film was further attached to the surface of the coating film with the release surface side facing each other. The coating film sandwiched between polyester films was roll-pressed in the air to obtain a semi-cured film. At the time of roll-pressing, a temperature of the film surface of the coating film was heated to 100° C., and the linear pressure was 544 N/cm.

The polyester films were peeled off from the obtained semi-cured film, sandwiched between an aluminum plate and a copper foil, and hot-pressed in the air (hot-pressed at a hot plate temperature of 180° C. and a pressure of 5 MPa for 5 minutes, and then further hot-pressed at 180° C. under normal pressure for 90 minutes) to obtain an aluminum base substrate with copper foil.

(Preparation Method C: Preparation of Test Specimens of Examples 30 to 31 and Comparative Examples 5 to 6)

Using the compositions of Examples 30 to 31 and Comparative Examples 5 to 6, test specimens were prepared according to the following procedures, respectively.

Using an applicator, the prepared composition was uniformly applied onto the release surface of the release-treated PET film (PET756501, produced by LINTEC Corporation, film thickness 75 μm), heated at 120° C. for 4 minutes, and then further heated at 80° C. for 2 minutes to obtain a semi-cured film.

The polyester films were peeled off from the obtained semi-cured film, sandwiched between an aluminum plate and a copper foil, and hot-pressed in the air (hot-pressed at a hot plate temperature of 180° C. and a pressure of 5 MPa for 5 minutes, and then further hot-pressed at 180° C. under normal pressure for 90 minutes) to obtain an aluminum base substrate with copper foil.

<Peel Test>

A copper foil peel strength of the obtained aluminum base substrate with copper foil was measured according to the method for measuring the peeling strength under normal conditions described in JIS C 6481.

A: 3 N/cm or greater
B+: 2.7 N/cm or greater and less than 3 N/cm
B−: 2.3 N/cm or greater and less than 2.7 N/cm
C: 2.0 N/cm or greater and less than 2.3 N/cm
D: Less than 2.0 N/cm Table 1 will be shown below.

In Table 1, the "amount (%)" column indicates the content (% by mass) of each component with respect to the total solid content.

The "number of aromatic rings" column indicates the number of monocyclic aromatic ring structures of the surface modifier A and the surface modifier B, respectively.

The "preparation method" column indicates which of the aforementioned preparation methods A to C corresponds to the preparation of the test specimen in each Example or Comparative Example.

TABLE 1

| | Characteristics of composition | | | | | | | | |
|---|---|---|---|---|---|---|---|---|---|
| | Epoxy compound | | Phenolic compound | | Curing accelerator | | Surface modifier A or comparison compound | | |
| Table 1 | Kind | Amount (%) | Kind | Amount (%) | Kind | Amount (%) | Kind | Number of aromatic rings | Amount (%) |
| Example 1 | C-3 | 16.0 | D-3 | 7.5 | E-1 | 0.16 | A-1 | 4 | 0.1 |
| Example 2 | C-3 | 16.0 | D-3 | 7.5 | E-1 | 0.16 | A-2 | 4 | 0.1 |
| Example 3 | C-3 | 16.0 | D-3 | 7.5 | E-1 | 0.16 | A-3 | 4 | 0.1 |
| Example 4 | C-3 | 16.0 | D-3 | 7.5 | E-1 | 0.16 | A-4 | 5 | 0.1 |
| Example 5 | C-3 | 16.0 | D-3 | 7.5 | E-1 | 0.16 | A-5 | 3 | 0.1 |
| Example 6 | C-3 | 16.0 | D-3 | 7.5 | E-1 | 0.16 | A-6 | 2 | 0.1 |
| Example 7 | C-3 | 16.0 | D-3 | 7.5 | E-1 | 0.16 | A-1 | 4 | 0.1 |
| Example 8 | C-3 | 16.0 | D-3 | 7.5 | E-1 | 0.16 | A-1 | 4 | 0.1 |
| Example 9 | C-3 | 16.0 | D-3 | 7.5 | E-1 | 0.16 | A-1 | 4 | 0.1 |
| Example 10 | C-3 | 16.0 | D-3 | 7.5 | E-1 | 0.16 | A-7 | 4 | 0.1 |
| Example 11 | C-3 | 16.0 | D-3 | 7.5 | E-1 | 0.16 | A-8 | 4 | 0.1 |
| Example 12 | C-3 | 16.0 | D-3 | 7.5 | E-2 | 0.16 | A-1 | 4 | 0.1 |
| Example 13 | C-3 | 16.0 | D-3 | 7.5 | E-3 | 0.16 | A-1 | 4 | 0.1 |
| Example 14 | C-3 | 16.0 | D-3 | 7.5 | E-4 | 0.16 | A-1 | 4 | 0.1 |
| Example 15 | C-3 | 16.0 | D-3 | 7.5 | E-5 | 0.16 | A-1 | 4 | 0.1 |
| Example 16 | C-3 | 16.0 | D-3 | 7.5 | E-6 | 0.16 | A-1 | 4 | 0.1 |
| Example 17 | C-3 | 16.0 | D-3 | 7.5 | E-1 | 0.16 | A-1 | 4 | 0.1 |
| Example 18 | C-3 | 14.6 | D-1 | 8.9 | E-1 | 0.16 | A-1 | 4 | 0.1 |
| Example 19 | C-3 | 11.6 | D-2 | 11.8 | E-1 | 0.16 | A-1 | 4 | 0.1 |
| Example 20 | C-3 | 16.0 | D-4 | 7.5 | E-1 | 0.16 | A-1 | 4 | 0.1 |
| Example 21 | C-3 | 12.8 | D-5 | 10.6 | E-1 | 0.16 | A-1 | 4 | 0.1 |

TABLE 1-continued

| | | | | | | | | | |
|---|---|---|---|---|---|---|---|---|---|
| Example 22 | C-3 | 12.5 | D-6 | 10.9 | E-1 | 0.16 | A-1 | 4 | 0.1 |
| Example 23 | C-1 | 18.2 | D-3 | 5.3 | E-1 | 0.16 | A-1 | 4 | 0.1 |
| Example 24 | C-2 | 17.6 | D-3 | 5.9 | E-1 | 0.16 | A-1 | 4 | 0.1 |
| Example 25 | C-3 | 17.7 | D-3 | 5.8 | E-1 | 0.16 | A-1 | 4 | 0.1 |
| Example 26 | C-3 | 16.1 | D-3 | 7.6 | E-1 | 0.16 | — | — | — |
| Example 27 | C-3 | 16.1 | D-3 | 7.6 | E-1 | 0.16 | — | — | — |
| Example 28 | C-3 | 10.9 | D-7 | 12.5 | E-1 | 0.16 | A-1 | 4 | 0.1 |
| Example 29 | C-3 | 10.9 | D-7 | 12.5 | E-1 | 0.16 | A-1 | 4 | 0.1 |
| Example 30 | C-3 | 10.9 | D-7 | 12.5 | E-1 | 0.16 | A-1 | 4 | 0.1 |
| Example 31 | C-3 | 10.9 | D-7 | 12.5 | E-1 | 0.16 | A-1 | 4 | 0.1 |
| Comparative Example 1 | C-3 | 16.0 | D-3 | 7.5 | E-1 | 0.16 | A-9 | — | 0.1 |
| Comparative Example 2 | C-3 | 16.0 | D-3 | 7.5 | E-1 | 0.16 | A-4 | 5 | 0.2 |
| Comparative Example 3 | C-3 | 16.0 | D-3 | 7.5 | E-1 | 0.16 | — | — | — |
| Comparative Example 4 | C-3 | 16.1 | D-3 | 7.6 | E-1 | 0.16 | — | — | — |
| Comparative Example 5 | C-3 | 11.0 | D-7 | 12.7 | E-1 | 0.16 | — | — | — |
| Comparative Example 6 | C-3 | 11.0 | D-7 | 12.7 | E-1 | 0.16 | — | — | — |

| | Characteristics of composition | | | | | | |
|---|---|---|---|---|---|---|---|
| | Surface modifier B or comparison compound | | | | Inorganic substance or surface-modified inorganic substance | | |
| Table 1 | Kind | Number of aromatic rings | Amount (%) | Dispersant Amount (%) | Mass ratio in inorganic substance or surface-modified inorganic substance | Amount (%) | Preparation method | Evaluation Peel strength |
| Example 1 | B-1 | 4 | 0.1 | 0.17 | Only HP40 - MF100 | 76 | A | A |
| Example 2 | B-2 | 4 | 0.1 | 0.17 | Only HP40 - MF100 | 76 | A | A |
| Example 3 | B-3 | 4 | 0.1 | 0.17 | Only HP40 - MF100 | 76 | A | A |
| Example 4 | B-4 | 5 | 0.1 | 0.17 | Only HP40 - MF100 | 76 | A | A |
| Example 5 | B-5 | 3 | 0.1 | 0.17 | Only HP40 - MF100 | 76 | A | B+ |
| Example 6 | B-6 | 2 | 0.1 | 0.17 | Only HP40 - MF100 | 76 | A | B- |
| Example 7 | B-7 | 4 | 0.1 | 0.17 | Only HP40 - MF100 | 76 | A | A |
| Example 8 | B-8 | 4 | 0.1 | 0.17 | Only HP40 - MF100 | 76 | A | A |
| Example 9 | B-9 | 4 | 0.1 | 0.17 | Only HP40 - MF100 | 76 | A | A |
| Example 10 | B-1 | 4 | 0.1 | 0.17 | Only HP40 - MF100 | 76 | A | A |
| Example 11 | B-1 | 4 | 0.1 | 0.17 | Only HP40 - MF100 | 76 | A | A |
| Example 12 | B-1 | 4 | 0.1 | 0.17 | Only HP40 - MF100 | 76 | A | A |
| Example 13 | B-1 | 4 | 0.1 | 0.17 | Only HP40 - MF100 | 76 | A | A |
| Example 14 | B-1 | 4 | 0.1 | 0.17 | Only HP40 - MF100 | 76 | A | A |
| Example 15 | B-1 | 4 | 0.1 | 0.17 | Only HP40 - MF100 | 76 | A | A |
| Example 16 | B-1 | 4 | 0.1 | 0.17 | Only HP40 - MF100 | 76 | A | A |
| Example 17 | B-1 | 4 | 0.1 | 0.17 | HP40 - MF100/AA-3/AA - 04 = 47/40/13 | 76 | A | A |
| Example 18 | B-1 | 4 | 0.1 | 0.17 | Only HP40 - MF100 | 76 | A | A |
| Example 19 | B-1 | 4 | 0.1 | 0.17 | Only HP40 - MF100 | 76 | A | A |
| Example 20 | B-1 | 4 | 0.1 | 0.17 | Only HP40 - MF100 | 76 | A | A |
| Example 21 | B-1 | 4 | 0.1 | 0.17 | Only HP40 - MF100 | 76 | A | A |
| Example 22 | B-1 | 4 | 0.1 | 0.17 | Only HP40 - MF100 | 76 | A | A |
| Example 23 | B-1 | 4 | 0.1 | 0.17 | Only HP40 - MF100 | 76 | A | A |
| Example 24 | B-1 | 4 | 0.1 | 0.17 | Only HP40 - MF100 | 76 | A | A |
| Example 25 | B-1 | 4 | 0.1 | 0.17 | Only HP40 - MF100 | 76 | A | A |
| Example 26 | — | — | — | 0.17 | Only BN - A1B1 | 76 | A | A |
| Example 27 | — | — | — | 0.17 | BN-A1/BN - B1 = 50/50 | 76 | A | A |
| Example 28 | B-1 | 4 | 0.1 | 0.17 | Only HP40 - MF100 | 76 | A | A |
| Example 29 | B-1 | 4 | 0.1 | 0.17 | Only HP40 - MF100 | 76 | B | A |
| Example 30 | B-1 | 4 | 0.1 | 0.17 | HP40 - MF100/AA-3/AA - 04 = 47/40/13 | 76 | C | A |
| Example 31 | B-1 | 4 | 0.1 | 0.17 | Only HP40 - MF100 | 76 | C | A |
| Comparative Example 1 | B-10 | — | 0.1 | 0.17 | Only HP40 - MF100 | 76 | A | C |
| Comparative Example 2 | — | — | — | 0.17 | Only HP40 - MF100 | 76 | A | C |
| Comparative Example 3 | B-4 | 5 | 0.2 | 0.17 | Only HP40 - MF100 | 76 | A | C |
| Comparative Example 4 | — | — | — | 0.17 | Only HP40 - MF100 | 76 | A | D |
| Comparative Example 5 | — | — | — | 0.17 | Only HP40 - MF100 | 76 | C | D |
| Comparative Example 6 | — | — | — | 0.17 | HP40 - MF100/AA-3/AA-04 = 47/40/13 | 76 | C | D |

From the results shown in the table, it was confirmed that with the composition according to the embodiment of the present invention, a thermally conductive material having excellent adhesiveness can be obtained.

In addition, it was confirmed that the same effect of the present invention can be obtained in either of a case where the surface-modified inorganic substance was separately produced and then the obtained surface-modified inorganic substance was mixed with other raw materials to obtain the composition according to the embodiment of the present invention, and a case where the inorganic substance and the surface modifier were mixed with other raw materials at the time of producing the composition, and the surface-modified inorganic substance was formed in the mixing system to obtain the composition according to the embodiment of the present invention (refer to comparison of results of Example 1 and Example 26).

From the viewpoint that the effect of the present invention is superior, it was confirmed that the surface modifier A and the surface modifier B preferably have 3 or more aromatic rings, and more preferably 4 or more aromatic rings (refer to the results of Examples 5 and 6 and the like).

In addition, it was confirmed that the thermally conductive material formed from the composition according to the embodiment of the present invention can achieve the effect of the present invention in either of a case where a semi-cured film was prepared using a press such as a flat plate press or a roll press, and a case where the semi-cured film was prepared without using a press.

<Confirmation of Thermally Conductive Properties>

In addition, in the preparation methods A to C of the aforementioned <Preparation of test specimen>, the semi-cured film was hot-pressed in the air without peeling the polyester film from the semi-cured film (treated at a hot plate temperature of 180° C. and a pressure of 5 MPa for 5 minutes, and then further treated at 180° C. under normal pressure for 90 minutes) to obtain a resin sheet. The polyester film attached to the resin sheet was peeled off to obtain a test sheet.

In a case where the thermal conductivity of the test sheets prepared by each preparation method using the composition of each example was measured, it was confirmed that all the test sheets show thermally conductive property of 10 W/m·K or greater, and are usable as thermally conductive sheets (sheet-shaped thermally conductive materials).

What is claimed is:

1. A composition for forming a thermally conductive material, comprising:
a surface-modified inorganic substance; and
a thermosetting compound,
wherein the surface-modified inorganic substance satisfies at least one of the following Requirement 1 or Requirement 2,
Requirement 1: The surface-modified inorganic substance is a surface-modified inorganic substance X containing an inorganic substance, and a surface modifier A and a surface modifier B adsorbed on a surface of the inorganic substance, the surface modifier A and the surface modifier B each independently have one or more adsorbent groups selected from the group consisting of an alkoxysilyl group, an aldehyde group, and a boronic acid group, and one or more aromatic rings, the total number of monocyclic aromatic ring structures in the one or more aromatic rings is 2 or greater, the surface modifier A further has one or more functional groups A selected from the group consisting of an epoxy group, an oxetanyl group, and an isocyanate group, the surface modifier B further has one or more functional groups B selected from the group consisting of a hydroxyl group, $-NHR^T$, a carboxyl group, a thiol group, or a phosphoric acid group, and $R^T$ represents a hydrogen atom or an alkyl group,
Requirement 2: The surface-modified inorganic substance includes a surface-modified inorganic substance A containing an inorganic substance and the surface modifier A adsorbed on the surface of the inorganic substance, and not containing the surface modifier B, and a surface-modified inorganic substance B containing an inorganic substance and the surface modifier B adsorbed on the surface of the inorganic substance, and not containing the surface modifier A.

2. The composition for forming a thermally conductive material according to claim 1,
wherein the total number of monocyclic aromatic ring structures in the one or more aromatic rings is each independently 3 or greater.

3. The composition for forming a thermally conductive material according to claim 1,
wherein the total number of monocyclic aromatic ring structures in the one or more aromatic rings is each independently 4 or greater.

4. The composition for forming a thermally conductive material according to claim 1,
wherein the inorganic substance includes an inorganic nitride.

5. The composition for forming a thermally conductive material according to claim 1,
wherein the thermosetting compound includes an epoxy compound.

6. The composition for forming a thermally conductive material according to claim 5,
wherein the thermosetting compound further includes a phenolic compound.

7. The composition for forming a thermally conductive material according to claim 1, further comprising:
a curing accelerator.

8. A thermally conductive material which is obtained by curing the composition for forming a thermally conductive material according to claim 1.

9. The composition for forming a thermally conductive material according to claim 2,
wherein the total number of monocyclic aromatic ring structures in the one or more aromatic rings is each independently 4 or greater.

10. The composition for forming a thermally conductive material according to claim 2,
wherein the inorganic substance includes an inorganic nitride.

11. The composition for forming a thermally conductive material according to claim 2,
wherein the thermosetting compound includes an epoxy compound.

12. The composition for forming a thermally conductive material according to claim 11,
wherein the thermosetting compound further includes a phenolic compound.

13. The composition for forming a thermally conductive material according to claim 2, further comprising:
a curing accelerator.

14. A thermally conductive material which is obtained by curing the composition for forming a thermally conductive material according to claim 2.

15. The composition for forming a thermally conductive material according to claim 3,
   wherein the inorganic substance includes an inorganic nitride.

16. The composition for forming a thermally conductive material according to claim 3,
   wherein the thermosetting compound includes an epoxy compound.

17. The composition for forming a thermally conductive material according to claim 16,
   wherein the thermosetting compound further includes a phenolic compound.

18. The composition for forming a thermally conductive material according to claim 3, further comprising:
   a curing accelerator.

19. A thermally conductive material which is obtained by curing the composition for forming a thermally conductive material according to claim 3.

\* \* \* \* \*